United States Patent [19]
Asanuma et al.

[11] Patent Number: 6,001,139
[45] Date of Patent: Dec. 14, 1999

[54] NONAQUEOUS SECONDARY BATTERY HAVING MULTIPLE-LAYERED NEGATIVE ELECTRODE

[75] Inventors: Hiroyuki Asanuma; Hiroshi Inoue; Yukio Maekawa; Mitsutoshi Tanaka; Yukio Miyaki; Hiroshi Ishizuka; Shoichiro Yasunami; Kazuo Sugiyama, all of Kanagawa, Japan

[73] Assignee: Fuji Photo Film Co., Ltd., Kanagawa, Japan

[21] Appl. No.: 08/860,804

[22] PCT Filed: Mar. 5, 1996

[86] PCT No.: PCT/JP96/00527

§ 371 Date: Jul. 10, 1997

§ 102(e) Date: Jul. 10, 1997

[87] PCT Pub. No.: WO96/27910

PCT Pub. Date: Sep. 12, 1996

[30] Foreign Application Priority Data

| Mar. 6, 1995 | [JP] | Japan | 7-045361 |
| Apr. 27, 1995 | [JP] | Japan | 7-103463 |
| Jul. 21, 1995 | [JP] | Japan | 7-185904 |
| Oct. 13, 1995 | [JP] | Japan | 7-265109 |
| Oct. 31, 1995 | [JP] | Japan | 7-283593 |
| Nov. 21, 1995 | [JP] | Japan | 7-302709 |
| Jan. 25, 1996 | [JP] | Japan | 8-010967 |

[51] Int. Cl.$^6$ .................................................. H01M 6/14

[52] U.S. Cl. .................................. 29/623.3; 429/231.95; 429/231.1; 429/137

[58] Field of Search .................................. 429/231.95, 94, 429/231.1, 133, 164, 60, 137, 48; 29/623.1, 623.3

[56] References Cited

U.S. PATENT DOCUMENTS

| 4,645,726 | 2/1987 | Hiratani et al. | 429/191 |
| 4,658,498 | 4/1987 | Yamamura et al. | 29/623.1 |
| 5,069,683 | 12/1991 | Fong et al. | 29/623.1 |
| 5,147,739 | 9/1992 | Beard | 429/194 |
| 5,314,765 | 5/1994 | Bates | 429/194 |
| 5,387,479 | 2/1995 | Koksbang | 429/126 |
| 5,478,671 | 12/1995 | Idota | 429/194 |
| 5,595,837 | 1/1997 | Olsen et al. | 429/194 |
| 5,616,429 | 4/1997 | Klementowski | 429/3 |
| 5,618,640 | 4/1997 | Idota et al. | 429/194 |
| 5,721,067 | 2/1998 | Jacobs et al. | 429/60 |

FOREIGN PATENT DOCUMENTS

| 5-151995 | 6/1993 | Japan | H01M 10/40 |

*Primary Examiner*—Maria Nuzzolillo
*Assistant Examiner*—Jennifer O'Malley
*Attorney, Agent, or Firm*—Sughrue, Mion, Zinn, Macpeak & Seas, PLLC

[57] ABSTRACT

This invention provides a cylinder type nonaqueous secondary battery which comprises a positive electrode active material comprising a lithium-containing transition metal oxide, a composite oxide or composite chalcogen negative electrode material capable of intercalating and deintercalating lithium and a nonaqueous electrolyte containing a lithium metal salt, wherein high discharging capacity and excellent charge and discharge cycle characteristics are obtained by mounting a metal foil mainly comprising lithium in advance in a coiled group in which a current collector sheet coated with the positive electrode active material (positive electrode sheet), another current collector sheet coated with the negative electrode material (negative electrode sheet) and a separator are coiled in a spiral form.

17 Claims, 3 Drawing Sheets

NONAQUEOUS SECONDARY BATTERY HAVING MULTIPLE-LAYERED NEGATIVE ELECTRODE

TECHNICAL FIELD

This invention relates to a nonaqueous secondary battery in which charge and discharge capacities and cycle characteristics are improved.

BACKGROUND ART

Lithium metals and lithium alloys are used as typical negative electrode materials in nonaqueous secondary batteries, but, when they are used, the lithium metal grows into a dendritic form during charging and discharging to generate a so-called dendrite which becomes a cause of internal short, or the high activity of the dendrite itself poses a possible danger of causing firing and the like.

On the other hand, calcined carbonaceous materials capable of reversely intercalating and deintercalating lithium have been put into practical use. Such carbonaceous material has a relatively small density which poses a disadvantage of having low capacity per volume. Because of this, use of the carbon material by pressing or laminating lithium foil thereto is described in JP-A-5-151995 (the term "JP-A" as used herein means an "unexamined published Japanese patent application"), but it cannot resolve the aforementioned problems.

Also, methods in which oxides of Sn, V, Si, B, Zr and the like or composite oxides thereof are used in negative electrode materials have been proposed (JP-A-5-174818, JP-A-6-60867, JP-A-6-275267, JP-A-6-325765, JP-A-6-338324, EP-615296). It is said that negative electrodes of these oxides or composite oxides provide nonaqueous secondary batteries having a large charging capacity of 3 to 3.6 V class when combined with a positive electrode of a certain type of lithium-containing transition metal compound and have markedly high safety, because they hardly generate dendrite within the practical range. However, batteries in which these materials are used have a serious problem in that their charge and discharge characteristics are not sufficient, and their charge and discharge efficiency in initial cycles is particularly low. That is, it is assumed that a portion of lithium molecules intercalated in the negative electrode during the charging step cause a plurality of irreversible side reactions during several initial stage cycles, so that lithium does not move into the positive electrode side during the discharging step, thereby causing capacity loss due to unnecessarily consumed lithium in the positive electrode. In order to compensate for such a capacity loss, it may be possible to intercalate lithium into the negative electrode material in advance in an amount corresponding to the capacity loss, but sufficient effect has not been obtained yet by such means.

The object of the present invention is to obtain a nonaqueous secondary battery which has 1) high charge and discharge capacities and excellent charge and discharge cycle characteristics and 2) a high energy density.

DISCLOSURE OF THE INVENTION

The present invention has been achieved by a cylinder type nonaqueous secondary battery which comprises a positive electrode active material comprising a lithium-containing transition metal oxide, a composite oxide or composite chalcogen negative electrode material capable of intercalating and deintercalating lithium and a nonaqueous electrolyte containing a lithium metal salt, wherein a metal foil mainly comprising lithium is mounted in advance on a coiled group in which a current collector sheet coated with said positive electrode active material (positive electrode sheet), another current collector sheet coated with said negative electrode material (negative electrode sheet) and a separator are coiled in a spiral form.

A nonaqueous secondary battery having a high energy density as an object of the present invention is substantially achieved when a part of or entire portion of the metal foil mainly comprising lithium introduced into the coiled group is finally incorporated into the negative electrode material. As a means for intercalating lithium in the negative electrode material, a method is possible in which lithium is introduced into the negative electrode material by forming a local electrochemical junction in a state that the negative electrode sheet and the metal foil mainly comprising lithium are electrically conducted. In this method, lithium is supplied into the negative electrode material through the formation of a local electrochemical junction comprising the metal foil mainly comprising lithium, which is the most efficient lithium supply source per unit volume, and the negative electrode material, so that it is possible to supply lithium in a corresponding amount to the side reactions without using the positive electrode active material.

The part on which the metal mainly comprising lithium is pressed is any optional area on the negative electrode sheet but preferably on the negative electrode material mixture layer coated with the negative electrode material or on the current collector metal on which the negative electrode material is not coated. Most preferably, it is on the negative electrode material mixture layer.

Preliminary intercalation of lithium into the negative electrode material may be effected by a method in which the metal foil mainly comprising lithium is laminated on the negative electrode sheet to assemble a nonaqueous secondary battery together with a separator and the positive electrode sheet and then an electrolytic solution is injected therein and subjected to aging for a predetermined period of time.

The metal foil mainly comprising lithium to be used in the preliminary intercalation may have a lithium content of preferably 90% or more, more preferably 98% or more.

Aluminum is desirable as a metal other than lithium.

It is possible to optionally control the intercalating amount of lithium by the laminating amount of lithium. The amount of lithium for preliminary intercalation is preferably from 0.5 to 4.0 equivalents, more preferably from 1 to 3.5 equivalents, most preferably from 1.2 to 3.2 equivalents, based on the negative electrode material.

Preliminary intercalation of lithium into the negative electrode material in an amount of more than 4.0 equivalents is not desirable because of the extreme deterioration of cycle characteristics. It is possible that local overcharge of the negative electrode active material is a cause of the deterioration of cycle characteristics, though it is not strictly clear.

In other words, the amount of lithium for preliminary intercalation is preferably from 0.005 to 0.2 g, more preferably from 0.04 to 0.15 g, based on the unit weight of the negative electrode material. When converted to the unit volume of the negative electrode sheet, it may be preferably from 1 to 30 g/m$^2$, more preferably from 4 to 16 g/m$^2$.

Pressing of the metal foil mainly comprising lithium on the negative electrode sheet can be made easily by press roller and the like. When the metal foil mainly comprising lithium is pressed on the negative electrode collector metal, the foil may have a thickness of preferably from 50 µm to 500 μm, more preferably from 50 to 250 μm. When the metal foil mainly comprising lithium is pressed on the negative electrode material mixture layer, the foil may have a thickness of preferably from 5 to 150 μm, more preferably from 5 to 100 μm, most preferably from 10 to 75 μm.

The battery of the present invention may be subjected to the main charging immediately after assembling, but it is desirable to carry out aging before the main charging, in order to effect uniform diffusion of lithium in the negative electrode material. The term "main charging" as used herein means a charging carried out by setting the final voltage to the desirable voltage range of the battery of the present invention, and the desirable voltage range is 3.8 to 4.3 V as the final charging voltage. The aging may be carried out preferably at a temperature of from 0 to 80° C. for a period of from 1 hour to 60 days, more preferably at 20 to 70° C. for 10 hours to 30 days.

It is further desirable to set the open circuit voltage of the battery to a preferable range during the aging, in order to effect uniform intercalation of lithium in the negative electrode material.

The open circuit voltage of this case is preferably 1.5 to 3.8 V, more preferably 1.5 to 3.5 V. Setting of the battery open circuit voltage to the preferred range may be effected by charging or charging and discharging the battery after injection of electrolytic solution and crimping. Timing of the charging or charging and discharging is preferably between immediately after the commencement of aging, namely from immediately after cramping to 60 days after the commencement of aging. More preferably, it may be between 1 hour and 30 days after the commencement of aging, most preferably between 3 hours and 10 days after the commencement of aging. The aging temperature of this case is within the range of preferably from 0 to 80° C., more preferably from 10 to 70° C., most preferably from 20 to 60° C. During the aging, the battery may be placed vertically or horizontally or continuously rolled.

When the open circuit voltage is set by charging, it is desirable to effect the charging by constant voltage charging under a current condition of from 0.05 to 4.1 mA per 1 cm$^2$ of the surface of the negative electrode sheet. The current value is more preferably from 0.1 to 3.0 mA, most preferably from 0.15 to 2.4 mA. The charging period is preferably from 0.2 to 20 hours, more preferably from 0.5 to 10 hours, most preferably from 0.5 to 5 hours.

When the open circuit voltage is set by charging and discharging, a combination of constant voltage charging and constant current discharging is desirable. Final charging voltage of the constant voltage charging is within the range of preferably from 2.0 to 3.8 V, more preferably from 2.5 to 3.5 V, most preferably from 2.7 to 3.5 V. Final discharging voltage of the constant current discharging is within the range of preferably from 1.0 to 3.5 V, more preferably from 1.5 to 3.3 V, most preferably from 2.5 to 3.1 V. The current condition in this case is within the range of preferably from 0.05 to 4.5 mA, more preferably from 0.1 to 3.0 mA, most preferably from 0.15 to 2.4 mA, per 1 cm$^2$ of the surface of the negative electrode sheet, in both cases of charging and discharging. The charging period is preferably from 0.2 to 20 hours, more preferably from 0.5 to 10 hours, most preferably from 0.5 to 5 hours. The number of charging and discharging cycles is preferably from 1 to 500 cycles, more preferably from 5 to 200 cycles, most preferably from 10 to 150 cycles. When the open circuit voltage is adjusted by charging and discharging, the adjustment may be completed either by charging or discharging.

The aforementioned charging or charging and discharging may be carried out at a temperature of preferably from 0 to 60° C., more preferably from 10 to 50° C., most preferably from 20 to 40° C. The charging or charging and discharging procedure may be carried out optional times during the aging, but preferably 1 to 3 times, more preferably only once.

The metal foil mainly comprising lithium may be pressed directly on the negative electrode material-containing negative electrode material mixture layer, but it is more desirable to arrange at least one layer of an auxiliary layer containing water insoluble particles on the mixture layer and press the foil on the auxiliary layer, in view of uniform intercalation of lithium. This auxiliary layer does not contain the negative electrode material.

Arrangement of a layer which is different from the active material, such as a protective layer, on the electrode surface has been examined in the prior art, and, in the case of negative electrodes of lithium metals and alloys, arrangement of protective layers comprising carbon materials and metal powder-containing carbon has been described in JP-A-4-229562, U.S. Pat. No. 5,387,479 and JP-A-3-297072. However, the object of these patents is to protect active part on the lithium metal surface, thereby preventing decomposition of the electrolytic solution caused by its contact with the active part and formation of a passive film from the decomposed products and the like, so that the construction and object of these inventions are different from those of the metal oxide negative electrode of the present invention.

JP-A-61-263069 describes that a transition metal oxide is used as the negative electrode material and its surface is coated with an ion-conductive solid electrolyte, and arrangement of the solid electrolyte film on the transition metal oxide layer by spattering is described in its Examples. Similar to the case of the aforementioned patents, the object of this patent is to prevent precipitation of dendritic form-lithium and decomposition of electrolytic solution, which therefore is different from the object of the instant invention. In addition, the ion-conductive solid electrolyte is not desirable because of its solubility in water and hygroscopicity.

Also, JP-A-61-7577 describes about a protective layer comprised of a material having both electric conductivity and ionic conductivity, covered on the surface of positive electrode, and describes that oxides of tungsten, molybdenum and vanadium are desirable as the material having electric-ionic mixture conductivity. However, these oxides are compounds capable of intercalating and deintercalating lithium, so that are not desirable in the present invention.

According to the present invention, the auxiliary layer to be arranged on the negative electrode sheet comprises at least one layer, and may be constructed by a plurality of the same or different layers. These auxiliary layers comprise water insoluble electrically conductive particles and a binder. The binder to be used in the formation of an electrode material mixture, which will be described later, can be used in this case. The electrically conductive particles to be included in the auxiliary layer may be used in an amount of preferably 2.5% by weight to 96% by weight, more preferably 5% by weight to 95% by weight, most preferably 10% by weight to 93% by weight.

Examples of the water insoluble electrically conductive particles of the present invention include particles of metals, metal oxides, metal fibers, carbon fibers and carbon black, graphite and the like carbon particles. These particles may have a solubility of 100 ppm or less in water, but preferably be insoluble in water. Of these water insoluble electrically conductive particles, those which have low reactivity with alkali metals, particularly with lithium, are desirable, and metal powders and carbon particles are more desirable. The particle-constituting elements may have an electrical resistivity of $5 \times 10^9$ $\Omega \cdot m$ or less at 20° C.

As the metal powders, those which have low reactivity with lithium, namely metals which hardly form lithium alloys, are preferred, and their illustrative examples include copper, nickel, iron, chromium, molybdenum, titanium, tungsten and tantalum. These metal powder may have a needle shape, a columnar shape, a plate shape or a mass shape, and a maximum particle size of preferably 0.02 $\mu$m to 20 $\mu$m, more preferably 0.1 $\mu$m to 10 $\mu$m. It is desirable that the surface of these metal powders is not oxidized, and if oxidized, it is desirable to treat them with heat in a reduced atmosphere.

As the carbon particles, carbon materials generally known as conductive materials to be combination-used with non-conductive electrode active materials can be used. Examples of these materials include thermal black, furnace black, channel black, lamp black or the like carbon black, flake graphite, scale graphite, earthy graphite or the like natural graphite, synthetic graphite, carbon fibers and the like. In order to mix and disperse these carbon particles with a binder, it is desirable to use carbon black and graphite in combination. As the carbon black, acetylene black and Ketjen black are preferred. The carbon particles may have a particle size of preferably 0.01 $\mu$m to 20 $\mu$m, more preferably 0.02 $\mu$m to 10 $\mu$m.

The aforementioned auxiliary layer may contain particles having no conductivity, in order to improve strength of the coated layer. Examples of such the particles include teflon fine powder, SiC, aluminum nitride, alumina, zirconia, magnesia, mullite, forsterite and steatite. It is desirable to use these particles in an amount of 0.01 time to 10 times of the conductive particles.

When the negative electrode is formed by coating the material mixture on both sides of the current collector, these auxiliary layers may be coated on both sides or one side thereof.

Coating method of the auxiliary layer may be effected by a method in which a material mixture mainly comprising a metal or metalloid oxide as a material capable of reversely intercalating and deintercalating lithium is coated on the current collector and then the auxiliary layer is coated by successive coating method or by a simultaneous coating method in which the material mixture layer and the auxiliary layer are simultaneously coated.

Next, the protective layer to be arranged on the positive electrode sheet is described below. The protective layer comprises at least one layer and may be constructed by a plurality of the same or different layers. These protective layers may be layers having substantially no electric conductivity, namely insulating layers, or electrically conductive layers similar to the case of the negative electrode sheet. In addition, the protecting layer may have a shape in which an insulating layer and an electrically conductive layer are laminated. The protective layer may have a thickness of preferably 0.2 $\mu$m to 40 $\mu$m, more preferably 0.3 $\mu$m to 20 $\mu$m. Also it is desirable that these particle-containing protective layers does not melt at 300° C. or less or form new films.

When the protective layer comprise water insoluble conductive particles and a binder, the electrically conductive particles used in the auxiliary layer of negative electrode sheet can be used. Preferred type, size and the like of the electrically conductive particles are the same as those in the case of the negative electrode sheet.

When the protective layers are insulating type, these layers may preferably contain organic or inorganic particles. These particles may have a particle size of preferably 0.1 $\mu$m to 20 $\mu$m, more preferably 0.2 $\mu$m to 15 $\mu$m. Preferred organic particles are crosslinked latex or fluorocarbon resin in the form of powder, which do not decompose at 300° C. or lower or form films. More preferred is fine powder of teflon.

Examples of the inorganic particles include carbides, suicides, nitrides, sulfides and oxides of metal and metalloid elements.

Among carbides, suicides and nitrides, SiC, aluminum nitride (AlN), BN and BP are preferred because of their high insulating capacity and chemical stability, and SiC in which BeO, Be or BN is used as a sintering aid is particularly preferred.

Among chalcogenides, oxides are preferred, particularly those which are hardly oxidized or reduced are preferred. Examples of such the oxides include $Al_2O_3$, $As_4O_6$, $B_2O_3$, $BaO$, $BeO$, $CaO$, $Li_2O$, $K_2O$, $Na_2O$, $In_2O_3$, $MgO$, $Sb_2O_5$, $SiO_2$, $SrO$ and $ZrO_4$. Of these oxides, $Al_2O_3$, $BaO$, $BeO$, $CaO$, $K_2O$, $Na_2O$, $MgO$, $SiO_2$, $SrO$ and $ZrO_4$ are particularly preferred. These oxides may be used alone or as a composite oxide. Examples of preferred compound as the composite oxide include mullite ($3Al_2O_3 \cdot 2SiO_2$), steatite ($MgO \cdot SiO_2$), forsterite ($2MgO \cdot SiO_2$), cordierite ($2MgO \cdot 2Al_2O_3 \cdot 5SiO_2$) and the like.

These insulating inorganic compound particles may be used by adjusting their particle size to preferably 0.1 $\mu$m to 20 $\mu$m, more preferably 0.2 $\mu$m to 15 $\mu$m, by controlling their formation conditions or by a grinding or the like means.

The protective layer is formed using these electrically conductive particles and/or particles having substantially no conductivity and a binder. As the binder, a binder to be used in the formation of the electrode material mixture, which will be described later, can be used. These particles may be used in an amount of preferably 40% by weight to 96% by weight, more preferably 50% by weight to 94% by weight, based on the total weight of the particles and binder.

The other materials for use in the preparation of the nonaqueous secondary battery of the present invention and production processes thereof are described in detail below.

The positive and negative electrodes to be used in the nonaqueous secondary battery of the present invention can be prepared by coating a positive electrode material mixture or a negative electrode material mixture on a current collector. In addition to a positive electrode active material or a negative electrode active material, the positive or negative electrode material mixture may also contain an electrically conductive agent, a binder, a dispersing agent, a filler, an ionic conductive agent, a pressure reinforcing agent and various additives.

Next, a method for the pressing of a metal foil mainly comprising lithium on a negative electrode material mixture layer or on an auxiliary layer arranged on the negative electrode material mixture layer is illustratively described below.

With regard to the laminating pattern, it is desirable to laminate a metal foil having a constant thickness on the entire area of the negative electrode sheet, but, since lithium preliminary intercalated into the negative electrode material diffuses gradually in the negative electrode material by aging, the foil may be laminated not on the entire sheet but partially in the shape of a stripe, a frame or a disc. In the case of such a partial laminating, uniform preliminary intercalation of lithium can be achieved by controlling size of the metal foil. It is desirable to laminate the stripe in a lengthwise direction or crosswise direction against the negative electrode sheet, in view of the production suitability. Constant laminating distance is desirable, but irregular distance may also be employed. A lattice like pattern prepared by combining lengthwise direction and crosswise direction may also be used, which is particularly desirable for the uniform preliminary intercalation of lithium. Size of the stripe is optionally selected depending on the size of the negative electrode sheet, but the stripe may have a width of preferably from a half the length of the side of the negative electrode sheet to 0.5 mm. More preferably, it may be from a half the length of the side of the negative electrode sheet to 1 mm, more preferably from a half the length of the side of the negative electrode sheet to 1.5 mm. The width of stripe of smaller than 0.5 mm would cause a difficulty in cutting and handling the metal foil. The term "width of stripe" as used herein means longitudinal direction of the electrode sheet. Also, it is particularly desirable that the length of stripe is equal to the width of the electrode.

When the stripe is laminated, patterns on the front and back sides of the sheet may be the same or different from each other. It is desirable to apply the metal foil to the back side of the surface where the metal foil is not applied.

When laminated in a frame shape, the frame may have any of triangular to polygonal shapes, but a quadrangular shape (a rectangle, a square or the like) is particularly preferred. From the handling point of view, the frame may have a size of preferably 4 mm$^2$ or more (2 mm×2 mm in the case of a square), more preferably 16 mm$^2$ or more (4 mm×4 mm in the case of a square).

Typical examples of the laminating pattern of lithium and negative electrode sheet are shown in FIG. 3. FIG. 3(a) is a frame pattern, and FIGS. 3(b) and (c) are stripe patterns.

When laminated in a disc form, the disc may have a completely round shape, an elliptical shape or any other circular form. From the handling point of view, the disc may have a size of preferably 4 mm$^2$ or more, more preferably 16 mm$^2$ or more.

In the case of partial laminating, any one of stripe, frame and disc patterns or a combination of two or more of them may be used.

In the negative electrode sheet, coating ratio of the metal foil lamination may be preferably 10 to 100%, more preferably 15 to 100%, most preferably 20 to 100%. The ratio of smaller than 10% would cause ununiform preliminary intercalation of lithium.

In this method, corresponding amount of lithium consumed by side reactions is supplied into the negative electrode material not from the positive electrode active material but from the laminated lithium.

A roll transfer method or a board transfer method is used for laminating the metal material mainly comprising lithium on the negative electrode sheet. In the roll transfer method, the metal foil cut to an optional size is once adhered to a roller and then continuously adhered to the negative electrode sheet by calender press. A twin roller system is desirable in view of the improvement of adhesiveness. Though not particularly limited, the roller may have a diameter of preferably from 0.5 to 100 cm, more preferably 1 to 50 cm. As the roller material, it is desirable to use a material which hardly reacts with lithium, which includes polyolefin (polyethylene, polypropylene or the like), teflon, polyimide, polycarbonate and the like polymers and stainless steel, molybdenum and the like metals. In the board transfer method, the metal foil cut to an optional size is once adhered on a flat board and then adhered on the negative electrode sheet by pressing. In this case, the adhesion is not continuous, and one or two or more sheets of the metal foil may be adhered simultaneously.

As the board material, the same material as described in the roll transfer method may be used preferably. In both of the roll transfer and board transfer methods, the laminating pressure may be preferably from 0.1 to 150 kg/cm$^2$, more preferably from 1 to 100 kg/cm$^2$.

Prior to its adhesion to a roller or a board, the metal foil is cut to an optional size, preferably using a cutter, a rolling cutter or a cutter for sewing machine. When the cutting is carried out, one or a mixture of solvents inert to lithium may be used, which include paraffin oil, carbonates (diethyl carbonate, ethylene carbonate, propylene carbonate and the like), esters (ethyl acetate, ethyl propionate and the like), ethers (diisopropyl ether, diethyl ether and the like) and aromatic hydrocarbons (benzene, toluene, xylene and the like).

The surface of the roller or board may be either smooth or non-smooth (such as an embossing-finished surface).

It is desirable to store the metal foil mainly comprising lithium in the air at a dew point of −10 to −80° C. until its contact with the electrolytic solution or to expose it at least once to a gaseous atmosphere containing 0.1 to 10% of carbon dioxide at a dew point of −10 to −80° C.

In the case of the gaseous atmosphere, it means an average value in a treating room or zone and does not mean a local value. That is, when the carbon dioxide content is described to be 0.1% to 10%, it includes a case of locally exceeding 10%. It is desirable to store the metal mainly comprising lithium in the aforementioned gaseous atmosphere always until its contact with the electrolytic solution, and it is desirable to store in the aforementioned gaseous atmosphere at least when the metal mainly comprising lithium is cut and when the metal mainly comprising lithium is pressed on the electrode sheet with a pressure. Alternatively, the aforementioned carbonic acid gas may be blown from a nozzle or the like in the midst of the cutting or pressing of the metal mainly comprising lithium. By the treatment with carbon dioxide under a condition of low dew point, stable surface-film of lithium carbonate is formed, and deterioration of lithium by oxygen, nitrogen, water and the like is prevented. In addition, since lithium carbonate is inert to the electrolytic solution, which will be described later, and has lithium ion-permeability, it protects the surface of the metal mainly comprising lithium, hardly exerting other actions.

The positive or negative electrode to be used in the present invention is prepared by coating a material mixture layer containing a positive electrode active material or a negative electrode material on a current collector. When the positive or negative electrode is in a sheet like shape, it is desirable to arrange the material mixture layer on both sides of the current collector, and the material mixture layer on one side may comprise a plurality of layers. In addition to the positive electrode active material or negative electrode material which concerns in the intercalation and deintercalation of light metal ions, the material mixture layer also contains a binder, an electrically conductive material and the like. In addition to the material mixture layer, the electrode may also have layers which do not contain active materials, such as a protective layer, an undercoating layer to be arranged on the current collector and an intermediate layer to be arranged between material mixture layers. Preferably, these layers having no active materials may contain electrically conductive particles, insulating particles, binders and the like.

The positive electrode active material to be used in the present invention may be a transition metal oxide which can reversely undergo intercalation and deintercalation of lithium, and a lithium-containing transition metal oxide is particularly preferred. Illustrative examples of these positive electrode active materials are disclosed, for example, in JP-A-61-5262, U.S. Pat. No. 4,302,518, JP-A-63-299056, JP-A-1-294364, JP-B-4-30146 (the term "JP-B" as used herein means an "examined Japanese patent publication"), U.S. Pat. No. 5,240,794, U.S. Pat. No. 5,153,081, JP-A-4-328,258 and JP-A-5-54,889.

Preferred examples of the lithium-containing transition metal oxide positive electrode active material to be used in the present invention include oxides of lithium-containing Ti, V, Cr, Mn, Fe, Co, Ni, Cu, Mo and W. Also, it may be mixed with other alkali metals than lithium (elements of the groups IA and IIA of the periodic table) and/or Al, Ga, In, Ge, Sn, Pb, Sb, Bi, Si, P, B and the like. These may be mixed in an amount of from 0 to 30 mol % based on the transition metal.

As a preferred lithium-containing transition metal oxide positive electrode active material to be used in the present invention, it is desirable to synthesize it by mixing If the compounds in such amounts that the molar ratio of lithium compound/transition metal compound (the term transition metal as used herein means at least one metal selected from the group consisting of Ti, V, Cr, Mn, Fe, Co, Ni, Mo and W) in respective total amounts becomes 0.3 to 2.2.

As a more preferred lithium-containing transition metal oxide positive electrode active material to be used in the present invention, it is desirable to synthesize it by mixing the compounds in such amounts that the molar ratio of lithium compound/transition metal compound (the term transition metal as used herein means at least one metal selected from the group consisting of V, Cr, Mn, Fe, Co and Ni) in respective total amounts becomes 0.3 to 2.2.

As the more preferred lithium-containing transition metal oxide positive electrode active material to be used in the present invention, $Li_xQO_y$ (Q mainly contains at least one transition metal selected from the group consisting of Co, Mn, Ni, V and Fe; x=0.02 to 1.2; Y=1.4 to 3) is desirable. As the Q, the transition metal may be mixed with Al, Ga, In, Ge, Sn, Pb, Sb, Bi, Si, P, B and the like. Their mixing ratio is preferably 0 to 30 mol % based on the transition metal.

Examples of the most preferred lithium-containing transition metal oxide positive electrode active material to be used in the present invention include $Li_xCoO_2$, $Li_xNiO_2$, $Li_xMnO_2$, $Li_xCo_gNi_{1-g}O_2$, $Li_xMn_2O_4$ and $Li_xCo_fV_{1-f}O_z$ (x=0.02 to 1.2, g=0.1 to 0.9, f=0.9 to 0.98 and z=2.01 to 2.3).

Examples of the most preferred lithium-containing transition metal oxide positive electrode active material to be used in the present invention include $Li_xCoO_2$, $Li_xNiO_2$, $Li_xMnO_2$, $Li_xCo_gNi_{1-g}O_2$, $Li_xMn_2O_4$ and $Li_xCo_fV_{1-f}O_z$ (x=0.02 to 1.2, g=0.1 to 0.9, f=0.9 to 0.98 and z=2.02 to 2.3). In this case, the value x described above is a value before the commencement of charging and discharging and changes by the charging and discharging.

The positive electrode active material can be synthesized by a method in which the lithium compound and transition metal compound are mixed and calcined or a method in which they are subjected to a solution reaction, of which the calcining method is particularly preferred. The calcining temperature to be employed in the present invention may be such a degree that a portion of the mixed compounds to be used in the present invention are decomposed and melted, and it may be preferably from 250 to 2,000° C., more preferably from 350 to 1,500° C. In the practice of calcination, it is desirable to carry out pre-calcining at 250 to 900° C. The calcining time is preferably 1 to 72 hours, more preferably 2 to 20 hours. Mixing of the materials may be carried out either by a dry method or a wet method. In addition, annealing may be carried out at 200 to 900° C. after calcination.

The calcining gas atmosphere is not particularly limited and may be either an oxidizing atmosphere or a reducing atmosphere. Examples of such the atmosphere includes air or a gas having optionally controlled oxygen concentration, or hydrogen, carbon monoxide, nitrogen, argon, helium, krypton, xenon, carbon dioxide or the like.

When the positive electrode material of the present invention is synthesized, chemical intercalation of lithium into a transition metal oxide may be effected preferably by allowing a lithium metal, lithium alloy or butyl lithium to react with the transition metal oxide.

Though not particularly limited, the positive electrode active material to be used in the present invention may have an average particle size of preferably from 0.1 to 50 µm. It is desirable that the volume of particles having a particle size of 0.5 to 30 µm is 95% or more. It is more preferable that a group of particles having a particle size of 3 µm or less occupies 18% or less of the total volume and a group of particles having a particle size of from 15 µm to 25 µm occupies 18% or less of the total volume. Though not particularly limited, these particles may have a specific surface area of preferably from 0.01 to 50 m²/g, more preferably from 0.2 to 1 m²/g, when measured by the BET method. It is desirable also that, when 5 g of the positive electrode active material is dissolved in 100 ml of distilled water, the supernatant liquor has a pH value of 7 to 12.

In order to obtain a desired particle size, commonly known crushers and classifiers can be used. For example, a mortar, a ball mill, a vibrating ball mill, a vibrating mill, a satellite ball mill, a planetary ball mill, a spinning air flow jet mill, a sieve and the like can be used.

The positive electrode active material thus obtained by calcining may be used after washing with water, an acidic aqueous solution, an alkaline aqueous solution, an organic solvent, a water-containing organic solvent and the like.

According to the present invention, a plurality of different positive electrode active materials may be used in combination. For example, a material which shows opposite expansion or shrinkage behavior at the time of charging or discharging can be used.

Preferred examples of the positive electrode active material which expands at the time of discharging (at the time of lithium ion intercalation) and shrinks at the time of charging (at the time of lithium ion deintercalation) include spinel type lithium-containing manganese oxides, and preferred examples of the positive electrode active material which shrinks at the time of discharging (at the time of lithium ion intercalation) and expands at the time of charging (at the time of lithium ion deintercalation) include lithium-containing cobalt oxides. The spinel type lithium-containing manganese oxide has a structural formula of preferably $Li_{2-x}Mn_2O_4$ (0≦x≦2), more preferably $Li_{1-x}Mn_2O_4$ (0≦x≦1). Preferred example of the lithium-containing cobalt oxide has a structure of $Li_{1-x}CoO_2$ (0≦x≦1).

The negative electrode material to be used in the present invention is a compound capable of intercalating and deintercalating light metal ions. Particularly preferred are light metals, light metal alloys, carbonaceous compounds, inorganic oxides, inorganic chalcogenides, metal complexes and organic high molecular compounds. These may be used alone or as a mixture thereof. Examples of such combination include a light metal with a carbonaceous compound, a light metal with an inorganic oxide and a light metal with a carbonaceous compound and an inorganic oxide. These negative electrode materials are desirable, because they provide high capacity, high discharge potential, high safety and high cycle characteristics.

Lithium is desirable as the light metal. Examples of the light metal alloy include a metal which forms alloy with lithium and a lithium-containing alloy. Particularly preferred are Al, Al—Mn, Al—Mg, Al—Sn, Al—In and Al—Cd.

The carbonaceous compound is a compound selected from the group consisting of natural graphite, artificial graphite, carbon obtained by vapor phase growth and carbon obtained by calcining an organic material, and particularly a compound having a graphite structure is desirable. In addition, the carbonaceous compound may contain other compounds than carbon, such as B, P, N, S, SiC and $B_4C$, in an amount of 0 to 10% by weight.

As the elements which form oxides or chalcogenides, transition metals or metal and metalloid elements of the groups 13 to 15 of the periodic table are desirable.

As the transition metal compound, single or composite oxides of V, Ti, Fe, Mn, Co, Ni, Zn, W and Mo or chalcogenides are particularly desirable. A more preferred example is a compound represented by $Li_pCO_qV_{1-q}O_r$ (wherein p=0.1 to 2.5, q=0 to 1, r=1.3 to 4.5) disclosed in JP-A-6-44,972.

The metal or metalloid compounds other than transition metals are selected from oxides of elements of the groups 13 to 15 of the periodic table, Al, Ga, Si, Sn, Ge, Pb, Sb and Bi, alone or as a combination of two or more, and chalcogenides.

Their preferred examples include $Al_2O_3$, $Ga_2O_3$, SiO, $SiO_2$, GeO, $GeO_2$, SnO, $SnO_2$, $SnSiO_3$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O^{SnSio}{}_3$, GeS, $GeS_2$, SnS, $SnS_2$, PbS, $PbS_2$, $Sb_2S_3$, $Sb_2S_5$, $SnSiS_3$ and the like. Also, these compounds may form composite oxides with lithium oxide, such as $Li_2GeO_3$ and $Li_2SnO_2$.

It is desirable that the aforementioned composite chalcogen compounds and composite oxides are mainly amorphous at the time of assembling into a battery. The term "mainly amorphous" as used herein means that the compound has a broad scattering zone having a peak at 20° to 40° as the 2θ value when measured by an X-ray diffraction method using CuKα rays, which may have crystalline diffraction lines. Preferably, the most strong strength among the crystalline diffraction lines found within 40° to 70° as the 2θ value is 500 times or less of the diffraction strength of the peak of 20° to 40° as the 2θ value of the broad scattering zone, more preferably 100 times or less and most preferably 5 times or less, but it is most particularly desirable that the compound does not have crystalline diffraction lines.

The aforementioned composite chalcogen compounds and composite oxides are composite compounds comprising transition metals and elements of the groups 13 to 15 of the periodic table, and composite chalcogen compounds and composite oxides mainly comprising two or more elements selected from the group consisting of B, Al, Ga, In, Tl, Si, Ge, Sn, Pb, P, As, Sb and Bi are more desirable.

Particularly preferred are composite oxides mainly comprising two or more elements selected from the group consisting of B, Al, Si, Ge, Sn and P.

These composite chalcogen compounds and composite oxides may contain elements of the groups 1 to 3 of the periodic table or halogen elements, mainly for the purpose of modifying their amorphous structure. They may also contain transition metals.

Among the aforementioned negative electrode materials, amorphous composite oxides mainly comprising tin are preferred, which are represented by formula (1) or (2).

$$SnM^1{}_aO_t \qquad (1)$$

In the above formula, $M^1$ represents two or more elements selected from the group consisting of Al, B, P, Si, Ge, elements of the groups 1, 2 and 3 of the periodic table and halogen elements, a represents a number of 0.2 to 3, and t represents a number of 1 to 7.

$$Sn_xT_{1-x}M^1{}_aO_t \qquad (2)$$

In the above formula, T represents a transition metal such as V, Ti, Fe, Mn, Co, Ni, Zn, W and Mo, x represents a number of 0.1 to 0.9, and $M^1$, a and t represent the same as defined in formula (1).

Among the compounds of (1), compounds of formula (3) are more desirable.

$$SnM^2{}_bO_t \qquad (3)$$

In the above formula, $M^2$ represents two or more elements selected from the group consisting of Al, B, P, Si, Ge, elements of the groups 1, 2 and 3 of the periodic table and halogen elements, b represents a number of 0.2 to 3, and t represents a number of 1 to 7.

Among compounds of (3), compounds of formula (4) are further desirable.

$$SnM^3{}_cM^4{}_dO_t \qquad (4)$$

In the above formula, $M^3$ represents at least one element selected from the group consisting of Al, B, P, Si and Ge, $M^4$ represents at least one element selected from the group consisting of the elements of the groups 1, 2 and 3 of the periodic table and halogen elements, c represents a number of 0.2 to 2, d represents a number of 0.01 to 1, wherein 0.2<c+d<3, and t represents a number of 1 to 7.

According to the present invention, an amorphous oxide mainly comprising Sn and Ge represented by formula (5) is particularly preferred.

$$SnGe_eM^5{}_fM^4{}_gO_t \qquad (5)$$

In the above formula, $M^5$ represents at least one element selected from the group consisting of Al, P, B and Si, $M^4$ represents at least one element selected from the group consisting of the elements of the groups 1, 2 and 3 of the periodic table and halogen elements similar to the case of formula (4), e represents a number of 0.001 to 1, f represents a number of 0.2 to 2, g represents a number of 0.01 to 1, and t represents a number of 1.3 to 7.

The amorphous complex oxide of the present invention can be obtained by either a calcining method or a solution method, but the calcining method is more preferable. In the calcining method, it is desirable to obtain the amorphous composite oxide by thoroughly mixing the oxides or compounds of elements described in formula (1) and then calcining the mixture.

As the calcining conditions, the temperature rise rate is preferably within the range of from 5° C. to 200° C. per minute, the calcining temperature is preferably within the range of from 500 to 1,500° C. and the calcining time is preferably within the range of from 1 to 100 hours. Also, the temperature down rate is preferably within the range of from 2° C. to $10^{7°}$ C.

The temperature rise ratio according to the present invention is an average rate of temperature rise of from "50% of the calcining temperature (expressed by °C.)" to "80% of the calcining temperature (expressed by °C.)", and the temperature down ratio according to the present invention is an average rate of temperature down of from "80% of the calcining temperature (expressed by °C.)" to "50% of the calcining temperature (expressed by °C.)".

The temperature down may be effected by cooling the material in a calcining furnace or by once taking the material out of the calcining furnace and then cooling for example by putting it into water. Also useful are ultra-quenching methods described in Ceramics Processing (page 217, 1987, edited by Gihodo), such as gun method, Hammer-Anvil method, slap method, gas atomize method, plasma spray method, centrifugal quenching method, melt drag method and the like. Alternatively, the cooling may be effected making use of the single roller method or twin roller method described on page 172 of New Glass Handbook (ed. by Maruzen, 1991). When a material which melts during the calcining is used, the material may be fed during the calcination while continuously taking out the calcined product. In the case of a material which melts during the calcination, it is desirable to stir the melted solution.

The calcining gas atmosphere is preferably an atmosphere having an oxygen content of 5% by volume or less, more preferably an inert gas atmosphere. Examples of the inert gas include nitrogen, argon, helium, krypton, xenon and the like. Most preferred inert gas is pure argon.

The compound to be used in the present invention may have an average particle size of preferably from 0.1 to 60 μm. More particularly, it is desirable that the average particle size is 0.7 to 25 μm and that 60% or more of the total volume is occupied by particles having a particle size of 0.5 to 30 μm. Also, it is desirable that a group of particles of the negative electrode active material having a particle size of 1 μm or less occupies 30% or less of the total volume and a group of particles having a particle size of from 20 μm or more occupies 25% or less of the total volume. As a matter of course, particle size of the material to be used does not exceed thickness of the material mixture layer on one side of the negative electrode.

In order to obtain a desired particle size, commonly known crushers and classifiers can be used. For example, a mortar, a ball mill, a sand mill, a vibrating ball mill, a satellite ball mill, a planetary ball mill, a spinning air flow jet mill, a sieve and the like can be used. The pulverization may be effected by a wet method which is carried out in the presence of water or methanol or the like organic solvent, if necessary. In order to obtain a desired particle size, it is desirable to carry out classification. The classification method is not particularly limited, and it can be made using a sieve, an air classifier or the like, if necessary. The classification can be made by either a dry method or a wet method.

The average particle size means median diameter of primary particles and is measured by a laser diffraction type particle size distribution measuring apparatus.

The thus obtained negative electrode material may be used after its washing with water, an acidic aqueous solution, an alkaline aqueous solution, an organic solvent or a water-containing organic solvent.

Examples of the negative electrode material of the present invention are shown below, though the present invention is not restricted by these materials.

$SnAl_{0.4}B_{0.5}P_{0.5}K_{0.1}O_{3.65}$, $SnAl_{0.4}B_{0.5}P_{0.5}Na_{0.2}O_{3.7}$, $SnAl_{0.4}B_{0.3}P_{0.5}Rb_{0.2}O_{3.4}$,
$SnAl_{0.4}B_{0.5}P_{0.5}Cs_{0.1}O_{3.65}$, $SnAl_{0.4}B_{0.4}P_{0.4}O_{3.2}$, $SnAl_{0.3}B_{0.5}P_{0.2}O_{2.7}$,
$SnAl_{0.3}B_{0.5}P_{0.2}O_{2.7}$, $SnAl_{0.4}B_{0.5}P_{0.3}Ba_{0.08}Mg_{0.08}O_{3.26}$,
$SnAl_{0.4}B_{0.4}P_{0.4}Ba_{0.08}O_{3.28}$, $SnAl_{0.4}B_{0.5}P_{0.5}O_{3.6}$, $SnAl_{0.4}B_{0.5}P_{0.5}Mg_{0.1}O_{3.7}$,
$SnAl_{0.5}B_{0.4}P_{0.5}Mg_{0.1}F_{0.2}O_{3.65}$, $SnB_{0.5}P_{0.5}Li_{0.1}Mg_{0.1}F_{0.2}O_{3.05}$,
$SnB_{0.5}P_{0.5}K_{0.1}Mg_{0.05}F_{0.1}O_{3.05}$, $SnB_{0.5}P_{0.5}K_{0.05}Mg_{0.1}F_{0.2}O_{3.03}$,
$SnB_{0.5}P_{0.5}K_{0.05}Mg_{0.1}F_{0.2}O_{3.03}$, $SnAl_{0.4}B_{0.5}P_{0.5}Cs_{0.1}Mg_{0.1}F_{0.2}O_{3.65}$,
$SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_{3}$,
$SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$,
$SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$,
$SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$,
$SnPCs_{0.05}Mg_{0.05}F_{0.1}O_{3.53}$, $Sn_{1.1}Al_{0.4}B_{0.2}Ba_{0.08}F_{0.08}O_{3.54}$,
$Sn_{1.1}Al_{0.4}B_{0.2}P_{0.6}Li_{0.1}K_{0.1}Ba_{0.1}F_{0.1}O_{3.65}$, $Sn_{1.1}Al_{0.4}B_{0.4}P_{0.4}Ba_{0.08}O_{3.34}$,
$Sn_{1.1}Al_{0.4}PCs_{0.05}O_{1.23}$, $Sn_{1.1}Al_{0.4}PK_{0.05}O_{4.23}$, $Sn_{1.2}Al_{0.5}B_{0.3}P_{0.4}Cs_{0.2}O_{3.5}$,
$Sn_{1.2}Al_{0.4}B_{0.2}P_{0.6}Ba_{0.08}O_{3.68}$, $Sn_{1.2}Al_{0.1}B_{0.2}P_{0.6}Ba_{0.08}F_{0.08}O_{3.04}$,
$Sn_{1.2}Al_{0.4}B_{0.2}P_{0.6}Mg_{0.04}Ba_{0.04}O_{3.68}$, $Sn_{1.2}Al_{0.4}B_{0.3}P_{0.5}Ba_{0.08}O_{3.58}$,
$Sn_{1.3}Al_{0.3}B_{0.3}P_{0.4}Na_{0.2}O_{3.3}$, $Sn_{1.3}Al_{0.2}B_{0.4}P_{0.4}Ca_{0.2}O_{3.4}$,
$Sn_{1.3}Al_{0.4}B_{0.4}P_{0.4}Ba_{0.2}O_{3.6}$, $Sn_{1.4}Al_{0.4}PK_{0.2}O_{4.6}$, $Sn_{1.4}Al_{0.2}Ba_{0.1}PK_{0.2}O_{4.45}$,
$Sn_{1.4}Al_{0.2}Ba_{0.2}PK_{0.2}O_{4.6}$, $Sn_{1.4}Al_{0.4}Ba_{0.2}PK_{0.2}Ba_{0.1}F_{0.2}O_{4.9}$,
$Sn_{1.4}Al_{0.4}PK_{0.3}O_{4.65}$, $Sn_{1.5}Al_{0.4}PK_{0.2}O_{4.4}$, $Sn_{1.5}Al_{0.4}PK_{0.1}O_{4.65}$,
$Sn_{1.5}Al_{0.4}PCs_{0.05}O_{4.63}$, $Sn_{1.5}Al_{0.4}PCs_{0.05}Mg_{0.1}F_{0.2}O_{4.63}$,
$SnGe_{0.001}P_{0.1}B_{0.1}K_{0.5}O_{1.65}$, $SnGe_{0.02}P_{0.3}K_{0.1}O_{1.84}$, $SnGe_{0.02}P_{0.15}B_{0.15}K_{0.1}O_{1.69}$,
$SnGe_{0.05}P_{0.3}B_{0.4}K_{0.1}O_{2.5}$, $SnGe_{0.05}P_{0.8}K_{0.1}O_{3.15}$, $SnGe_{0.05}P_{0.6}B_{0.3}Mg_{0.1}K_{0.1}O_{3.8}$,
$SnGe_{0.05}P_{0.5}B_{0.5}Cs_{0.05}K_{0.05}O_{3.15}$, $SnGe_{0.1}P_{0.9}K_{0.1}O_{3.5}$,
$SnGe_{0.1}P_{0.7}B_{0.2}K_{0.1}Mg_{0.1}O_{3.3}$, $SnGe_{0.1}P_{0.5}B_{0.5}Ba_{0.05}K_{0.1}O_{2.3}$,
$SnGe_{0.1}P_{0.5}B_{0.5}Pb_{0.05}K_{0.1}O_{2.3}$,
$SnGe_{0.1}P_{0.5}B_{0.5}Mg_{0.05}K_{0.15}O_{3.325}$, $SnGe_{0.1}P_{0.5}B_{0.5}Mg_{0.2}K_{0.05}O_{3.425}$,
$SnGe_{0.1}P_{0.5}B_{0.5}Mg_{0.01}O_{3.201}$, $SnGe_{0.1}P_{0.5}B_{0.5}Al_{0.03}Mg_{0.1}K_{0.1}O_{3.425}$,
$SnGe_{0.1}P_{0.5}B_{0.5}Mg_{0.1}Li_{0.1}O_{3.35}$, $SnSi_{0.5}Al_{0.1}B_{0.2}P_{0.1}Ca_{0.4}O_{3.1}$,
$SnSi_{0.4}Al_{0.2}B_{0.4}O_{2.7}$, $SnSi_{0.5}Al_{0.2}B_{0.1}P_{0.1}Mg_{0.1}O_{2.8}$, $SnSi_{0.6}Al_{0.2}B_{0.2}O_{2.8}$,
$SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.6}Al_{0.1}B_{0.1}P_{0.3}O_{3.25}$,
$SnSi_{0.6}Al_{0.1}B_{0.1}P_{0.1}Ba_{0.2}O_{2.95}$, $SnSi_{0.6}Al_{0.1}B_{0.1}P_{0.1}Ca_{0.2}O_{2.95}$,
$SnSi_{0.6}Al_{0.4}B_{0.2}Mg_{0.1}O_{3.2}$, $SnSi_{0.6}Al_{0.1}B_{0.3}P_{0.1}O_{3.05}$, $SnSi_{0.6}Al_{0.2}Mg_{0.2}O_{2.7}$,
$SnSi_{0.6}Al_{0.2}Ca_{0.2}O_{2.7}$, $SnSi_{0.6}Al_{0.2}P_{0.2}O_{3}$, $SnSi_{0.6}B_{0.2}P_{0.2}O_{3}$, $SnSi_{0.8}Al_{0.2}O_{2.9}$, $SnSi_{0.8}Al_{0.3}B_{0.2}P_{0.2}O_{3.85}$, $SnSi_{0.8}B_{0.2}O_{2.9}$, $SnSi_{0.8}Ba_{0.2}O_{2.8}$, $SnSi_{0.8}Mg_{0.2}O_{2.8}$, $SnSi_{0.8}Ca_{0.2}O_{2.8}$, $SnSi_{0.8}P_{0.2}O_{3.1}$,
$Sn_{0.9}Mn_{0.3}B_{0.4}P_{0.1}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$, $Sn_{0.9}Mn_{0.1}Mg_{0.1}P_{0.9}O_{3.35}$,
$Sn_{0.2}Mn_{0.8}Mg_{0.1}P_{0.9}O_{3.35}$, $Sn_{0.7}Pb_{0.3}Ca_{0.1}P_{0.9}O_{3.35}$,

Chemical structure of these compounds obtained by calcining can be calculated by an inductive coupling plasma (ICP) emission spectral analysis as a measuring method and from weight difference of powder before and after its calcining as a simplified method.

Intercalating amount of a light metal into the negative electrode material of the present invention may be approximate value of deposition potential of the light metal, for example, preferably 50 to 700 mol %, more preferably 100 to 600 mol %, per negative electrode material. It is desirable that its deintercalating amount is larger than the intercalating amount. Intercalation of the light metal may be effected preferably by an electrochemical, chemical or thermal method. Preferably, the electrochemical method may be effected by electrochemically introducing a light metal contained in the positive electrode active material or by electrochemically introducing directly from a light metal or its alloy. In the chemical method, the negative electrode material is mixed and contacted with a light metal or allowed to react with an organic metal such as butyl lithium or the like. These electrochemical and chemical methods are desirable. Lithium or lithium ion is particularly desirable as said light metal.

Various elements can be contained in the negative electrode material of the present invention. For example, it may contain lanthanoid metals (Hf, Ta, W, Re, Os, Ir, Pt, Au and Hg) and dopants of various electric conductivity increasing compounds (for example, compounds of Sb, In and Nb). These compounds may be added in an amount of preferably from 0 to 5 mol %.

The surface of the positive electrode active material or negative electrode material of oxide to be used in the present invention can be coated with oxides whose chemical formulae are different from the positive electrode active material or negative electrode material to be used. As such surface oxides, oxides containing a compound which dissolves under both acidic and alkaline conditions are desirable. Metal oxides having high electronic conductivity are further desirable. For example, it is desirable to include dopants (for example, metals having different valency, halogen elements and the like in the case of oxides) into $PbO_2$, $Fe_2O_3$, $SnO_2$, $In_2O_3$, $ZnO$ and the like or oxides thereof. Particularly preferred are $SiO_2$, $SnO_2$, $Fe_2O_3$, $ZnO$ and $PbO_2$.

Amount of the surface-treated metal oxide is preferably from 0.1 to 10% by weight, more preferably from 0.2 to 5% by weight, most preferably from 0.3 to 3% by weight, based on said positive electrode active material or negative electrode material.

In addition to the above, the surface of the positive electrode active material or negative electrode material can be modified. For example, the surface of metal oxide may be treated with an esterificating agent, a chelating agent, a conductive high polymer, a polyethylene oxide or the like.

Also, the surface of the negative electrode material can be modified. For example, it can be treated by arranging a layer of an ion conductive polymer or polyacetylene. In addition, the positive electrode active material or negative electrode material may be passed through a purification step such as water washing.

The electrode material mixture can contain an electrically conductive agent, a binder, a filler, a dispersing agent, an ion conductive agent, a pressure reinforcing agent, and various other additives.

The electrically conductive agent is not particularly limited, provided that it is an electron conductive material which does not cause chemical changes in the assembled battery. In general, natural graphite (flake graphite, scale graphite, earthy graphite or the like), artificial graphite and the like graphites, acetylene black, Ketjen black, channel black, furnace black, lamp black, thermal black and the like carbon blacks, carbon fiber, metal fiber and the like electrically conductive fibers, copper, nickel, aluminum, silver and the like metal powders, zinc oxide, potassium titanate and the like electrically conductive whiskers, titanium oxide and the like electrically conductive metal oxides or polyphenylene derivatives and the like organic electrically conductive materials are used alone or as a mixture thereof. Of these conductive agents, acetylene black or combination use of graphite and acetylene black is particularly preferred. When a water-dispersed mixture material is prepared, it is desirable to disperse the electrically conductive agent in water in advance.

Though not particularly limited, the electrically conductive agent may be added in an amount of preferably from 1 to 50% by weight, more preferably from 1 to 30% by weight. In the case of carbon or graphite, an amount of from 2 to 15% by weight is particularly preferred.

Examples of the binder include polysaccharides, thermoplastic resins and polymers having rubber elasticity, which may be used alone or as a mixture thereof. The preferred examples include starch, polyvinyl alcohol, carboxymethylcellulose, hydroxypropylcellulose, regenerated cellulose, diacetylcellulose, polyvinyl chloride, polyvinyl pyrrolidone, polytetrafluoroethylene, polyvinylidene fluoride, polyethylene, polypropylene, ethylene-propylenediene terpolymer (EPDM), sulfonated EPDM, styrene butadiene rubber, polybutadiene, fluoroelastomer and polyethylene oxide. When a polysaccharide or the like compound having functional groups which react with lithium is used, it is desirable to deactivate such functional groups by adding an isocyanate group or the like compound. Though not particularly limited, the binder may be added in an amount of preferably from 1 to 50% by weight, more preferably from 2 to 30% by weight. Distribution of the binder in the material mixture may be either uniform or uneven. Preferred binder of the present invention is a polymer having a decomposition temperature of 300° C. or more. Examples of such a type of polymer include polyethylene, polypropylene, polytetrafluoroethylene (PTFE), polyvinylidene fluoride (PVDF), tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer and the like.

The filler is not particularly limited, provided that it is a fibrous material which does not cause chemical changes in the assembled battery. In general, fibers of polypropylene, polyethylene and the like olefinic polymers and of glass, carbon and the like are used. Though not particularly limited, the filler may be added in an amount of preferably from 0 to 30% by weight.

As the ion conductive agent, materials known as inorganic and organic solid electrolytes can be used, which will be described later in detail in relation to the electrolytic solution. The pressure reinforcing agent is an inner pressure increasing compound which will be described later, and its typical examples include carbonates.

The positive or negative electrode to be used in the nonaqueous secondary battery of the present invention can be prepared by coating a positive electrode material mixture or negative electrode material mixture on a current collector. In addition to the material mixture layer containing positive electrode active material or negative electrode material, the positive and negative electrodes may further have an undercoating layer which is introduced with the aim of increasing adhesiveness between the collector and mixture layer and improving conductivity, as well as a protecting layer which is introduced for the purpose of mechanically and chemically protecting the mixture layer.

In addition to the positive electrode active material or negative electrode material, the positive and negative electrode mixture materials may respectively contain an electrically conductive agent, a binder, a dispersing agent, a filler, an ion conductive agent, a pressure reinforcing agent and various other additives. The undercoating layer and protective layer may contain particles of binder and electrically conductive agent and particles having no conductivity.

The electrolyte comprises in general a solvent and a lithium salt (anion and lithium cation) which dissolves in the solvent. Examples of the solvent include propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, ethylmonoglyme, phosphoric acid triester, trimethoxymethane, a dioxolan derivative, sulfolan, 3-methyl-2-oxazolidinone, a propylene carbonate derivative, a tetrahydrofuran derivative, ethyl ether, 1,3-propanesultone and the like aprotic organic solvent, which may be used alone or as a mixture of two or more. Examples of the anion of lithium salt which dissolves in these solvents include $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^{2-}$, (1,2-dimethoxyethane)$_2ClO_4^-$, lower aliphatic carboxylic acid ion, $AlCl_{14}^-$, $Cl^-$, $Br^-$, $I^-$, anion of a chloroborane compound and tetraphenyl boric acid ion, which may be used alone or as a mixture of two or more. Among these, a cyclic carbonate and/or acyclic carbonate are particularly preferred. For example, it is desirable to include diethyl carbonate, dimethyl carbonate and methylethyl carbonate. Also, it is desirable to include ethylene carbonate and propylene carbonate. In a preferred electrolyte, $LiCF_3SO_3$, $LiClO_4$, $LiBF_4$ and/or $LiPF_6$ is included in an electrolytic solution prepared by mixing ethylene carbonate optionally with propylene carbonate, 1,2-dimethoxyethane, dimethyl carbonate or diethyl carbonate. As the supporting salt, $LiPF_6$ is particularly preferred.

Amount of these electrolytes to be added to the battery is not particularly limited and decided based on the amount of the positive electrode active material and negative electrode material and the size of battery.

Though not particularly limited, concentration of the supporting electrolyte may be within the range of from 0.2 to 3 mols per 1 liter of the electrolytic solution.

The following solid electrolytes can be used in combination with the electrolytic solution.

Solid electrolytes are divided into inorganic solid electrolytes and organic solid electrolytes.

As the inorganic solid electrolytes, nitrides, halides and oxygen acid salts of Li are well known. Particularly preferred among them are $Li_3N$, $LiI$, $Li_5NI_2$, $Li_3N$-$LiI$-$LiOH$, $Li_4SiO_4$, $Li_4SiO_4$-$LiI$-$LiOH$, $xLi_3PO_4$-$(1-x)Li_4SiO_4$, $Li_2SiO_3$, phosphorous sulfide compounds and the like.

As the organic solid electrolyte, a polyethylene oxide derivative or a polymer containing said derivative, a polypropylene oxide derivative or a polymer containing said derivative, a polymer containing ion dissociation groups, a mixture of a polymer containing ion dissociation groups with the aforementioned aprotic electrolytic solution, a phosphoric acid ester polymer and a high molecular matrix material containing an aprotic polar solvent are useful. As an alternative method, polyacrylonitrile may be added to an electrolytic solution. Also known is a method in which inorganic and organic solid electrolytes are combination-used.

Also, other compounds may be added to the electrolyte in order to improve discharging and charging/discharging characteristics. Examples of such compounds include pyridine, triethyl phosphite, triethanolamine, cyclic ether, ethylenediamine, n-glyme, hexaphosphoric triamide, nitrobenzene derivative, sulfur, quinone imine dye, N-substituted oxazolidinone and N,N'-substituted imidazolidinone, ethylene glycol dialkyl ether, quaternary ammonium salt, polyethylene glycol, pyrrole, 2-methoxyethanol, $AlCl_3$, monomer of electrically conductive polymer electrode active material, triethylenephosphoramide, trialkylphosphine, morpholine, aryl compound having carbonyl group, crown ethers such as 12-crown-4, hexamethylphosphoric triamide and 4-alkylmorpholine, bicyclic tertially amine, oil, quaternary phosphonium salt, tertially sulfonium salt and the like.

In order to obtain a noncombustible electrolytic solution, a halogen-containing solvent such as carbon tetrachloride, ethylene chloride trifluoride or the like can be contained in the electrolytic solution. Also, carbon dioxide can be contained in the electrolytic solution, in order to give high temperature preservation capacity.

In addition, an electrolytic solution or electrolyte can be contained in the mixture of positive and negative electrode materials. For example, a method is known in which the aforementioned ion conductive polymer or nitromethane or an electrolytic solution is contained.

As the separator, an insulating microporous thin film having large ion permeability and desired mechanical strength is used. It is desirable that such a film has a function to block its pores at 80° C. or more to increase resistance. From the viewpoint of organic solvent resistance and hydrophobic property, a sheet or nonwoven fabric prepared from an olefinic polymer such as polypropylene and/or polyethylene or glass fibers is used. With regard to the pore size of separator, the generally used range of battery separator is used. For example, a range of from 0.01 to 10 μm may be used. With regard to the thickness of separator, the generally used range of battery separator is used. For example, a range of from 5 to 300 μm may be used. The separator may be produced by synthesizing a polymer and then making pores by a dry, drawing, solution or solvent removing method or by a combination thereof.

As the current collector of electrode active material, any electron conductive material can be used, with the proviso that it does not cause chemical changes in the assembled battery. For example, stainless steel, nickel, aluminum, titanium, carbon or the like, as well as aluminum or stainless steel whose surface is treated with carbon, nickel, titanium or silver, is used as the material of the current collector in the positive electrode. Aluminum or an aluminum alloy is particularly preferred. In the negative electrode, stainless steel, nickel, copper, titanium, aluminum, carbon or the like, as well as copper or stainless steel whose surface is treated with carbon, nickel, titanium or silver, or an Al—Cd alloy is used as the material of the current collector in the negative electrode. Of these materials, copper or a copper alloy is particularly preferred. The surface of these materials may be oxidized. It is desirable to make rough on the current collector surface by a surface treatment. With regard to its shape, a foil, a film, a sheet, a net, a punched body, a lath body, a porous body, a foamed body, a molded body of fibers and the like can be used. Though not particularly limited, it may have a thickness of from 1 to 500 $\mu$m.

The battery can be made into any shape such as a sheet shape, a cylindrical shape, a flat shape, an angular shape or the like.

The material mixture of the positive electrode active material or negative electrode material is mainly used by coating it on a current collector and drying and compressing thereafter. The coating can be effected in the usual way. For example, a reverse roll method, a direct roll method, a blade method, a knife method, an extrusion method, a curtain method, a gravure method, a bar method, a dip method and a squeeze method can be used. Of these methods, the blade, knife and extrusion methods are preferred. It is desirable that the coating is carried out at a rate of from 0.1 to 100 m/minute. In that case, excellent surface conditions of the coated layer can be obtained by selecting the aforementioned coating method in response to the physical solution properties and drying property of the material mixture. The coating may be made on one side and then the other side or on both sides at the same time. Also, the coating may be carried out continuously, intermittently or in a stripe fashion. Though thickness, length and width of the coated layer are decided depending on the size of battery, it is particularly desirable that the coated layer on one side has a thickness of from 1 to 2,000 $\mu$m under a compressed condition after drying.

With regard to the drying or dehydration method of the sheet, generally used methods can be employed. It is particularly desirable to use hot air, vacuum, infrared radiation, far infrared radiation, electron beam and low moisture air, alone or in a combination thereof. The temperature may be within the range of preferably from 80 to 350° C., more preferably from 100 to 250° C. The water content is preferably 2,000 ppm or less in the whole battery, and, in the case of the positive electrode material mixture, negative electrode material mixture and electrolyte, it is desirable to control the water content in the positive and negative electrode material mixture respectively to 500 ppm or less from the viewpoint of cycle characteristics.

Pressing of the sheet can be effected by generally used methods, and die press method and calender press method are particularly preferred. The pressure is not particularly limited, but a pressure of from 0.2 to 3 t/cm$^2$ is desirable. Pressing rate of the calender press method is preferably from 0.1 to 50 m/minute. The pressing temperature is preferably from room temperature to 200° C. Ratio of the width of the negative electrode sheet to that of the positive electrode sheet is preferably 0.9 to 1.1. A ratio of 0.95 to 1.0 is particularly preferred. Ratio of the content of the positive electrode active material to that of the negative electrode material cannot be defined because of the differences in the kinds of compounds and the mixture material formulations, but can be set to an optimum value by taking the capacity, cycle characteristics and safety into consideration.

After laminating said material mixture sheets via a separator, these sheets are coiled or folded and inserted into a case, the sheets and the case are electrically connected, an electrolytic solution is injected therein and then a battery case is formed using a sealing plate. In this case, an explosion-proof valve can be used as the sealing plate. In addition to the explosion-proof valve, conventionally various well-known safety elements may be attached to the battery case. For example, a fuse, a bimetal, a PTC element or the like can be used as a overcurrent preventing element. Also, in addition to the explosion-proof valve, a method in which a notch is made in the battery case, a method in which a crack is made in the gasket or a method in which a crack is made in the sealing plate can be employed as an inner pressure increment countermeasure. Also, a protecting circuit in which an overcharge/overdischarge countermeasure is integrated may be installed in a battery charger or independently connected. In addition, a method in which electric current is blocked by the increase in the battery internal pressure may be employed as an overcharge countermeasure. In that case, a compound capable of increasing internal pressure can be contained in the material mixture or electrolyte. Examples of the internal pressure increasing compound include $Li_2CO_3$, $LiHCO_3$, $Na_2CO_3$, $NaHCO_3$, $CaCO_3$, $MgCO_3$ and the like carbonates.

Metals and alloys having electric conductivity can be used in the case and lead plate. For example, iron, nickel, titanium, chromium, molybdenum, copper, aluminum and the like metals or alloys thereof can be used. Welding of the cap, case, sheet and lead plate can be effected by well-known methods (for example, direct or alternating current electric welding, laser beam welding and ultrasonic welding). As the seal plate sealing agent, asphalt and the like conventionally well-known compounds and mixtures can be used.

The application of the nonaqueous secondary battery of the present invention is not particularly limited. For example, it is useful in electronic equipment such as notebook size color personal computers, note book size monochromatic personal computers, sub-notebook size personal computers, pen input personal computers, pocket size (palmtop) personal computers, notebook size word processors, pocket size word processors, electron book players, pocket phones, wireless extensions of key telephone sets, pagers, handy terminals, portable facsimiles, portable copying machines, portable printers, headphone stereos, video cameras, liquid crystal TV sets, handy cleaners, portable CD systems, mini disk systems, electrical shavers, machine translation systems, land mobile radiotelephones, transceivers, electrical tools, electronic notebooks, portable calculators, memory cards, tape recorders, radios, backup power sources, memory cards and the like. It is also useful in national life items such as automobiles, electrically powered vehicles, motors, lights, toys, family (home) computers, load conditioners, irons, watches, stroboscopic lamps, cameras and medical equipment (for example, pacemakers, hearing aids, massaging machines and the like). It can also be used in various types of military equipment and spacecraft equipment. In addition, it can also be used in combination with other secondary batteries, solar batteries or primary batteries.

It is desirable to combine proper chemical materials and battery constituting parts of the present invention described in the foregoing, and it is particularly desirable that $Li_xCoO_2$ and $Li_xMn_2O_4$ (wherein $0 \leq x \leq 1$) as a positive electrode active material and acetylene black as a conductive agent are contained. The positive electrode current collector is prepared from stainless steel or aluminum and has a net, sheet, foil, lath or the like shape. As the negative electrode material, it is desirable to use at least one compound selected from the group consisting of lithium metal, a lithium alloy (Li—Al), a carbonaceous compound, an oxide ($LiCoVO_4$, $SnO_2$, $SnO$, $SiO$, $GeO_2$, $GeO$, $SnSiO_3$ or $SnSi_{0.3}Al_{0.1}B_{0.2}P_{0.3}O_{3.2}$), a sulfide ($TiS_2$, $SnS_2$, $SnS$, $GeS_2$ or $GeS$) and the like. The negative electrode current collector is prepared from stainless steel or copper and has a net, sheet, foil, lath or the like shape. The material mixture to be used together with the positive electrode active material or negative electrode material may be mixed with acetylene black, graphite or the like carbon material as an electron conductive agent. As the binder, polyvinylidene fluoride, polyfluoroethylene or the like fluorine-containing thermoplastic compound, acrylic acid-containing polymer, styrene butadiene rubber, ethylene propylene terpolymer and the like elastomers may be used alone or as a mixture thereof. As the electrolytic solution, it is desirable to use ethylene carbonate, diethyl carbonate, dimethyl carbonate and the like cyclic or acyclic carbonates or ethyl acetate and the like ester compounds in combination, using $LiPF_6$ as a supporting electrolyte and further mixing with $LiBF_4$, $LiCF_3SO_3$ and the like lithium salts. As the separator, it is desirable to use polypropylene or polyethylene singly or in combination. The battery may have a cylindrical, flat or angular shape. It is desirable to equip the battery with a means to secure safety at the time of malfunction (for example, an internal pressure releasing type explosion-proof valve, a current blocking type safety valve or a separator which increases resistant at a high temperature).

BEST MODE OF CARRYING OUT THE INVENTION

Figure 1:
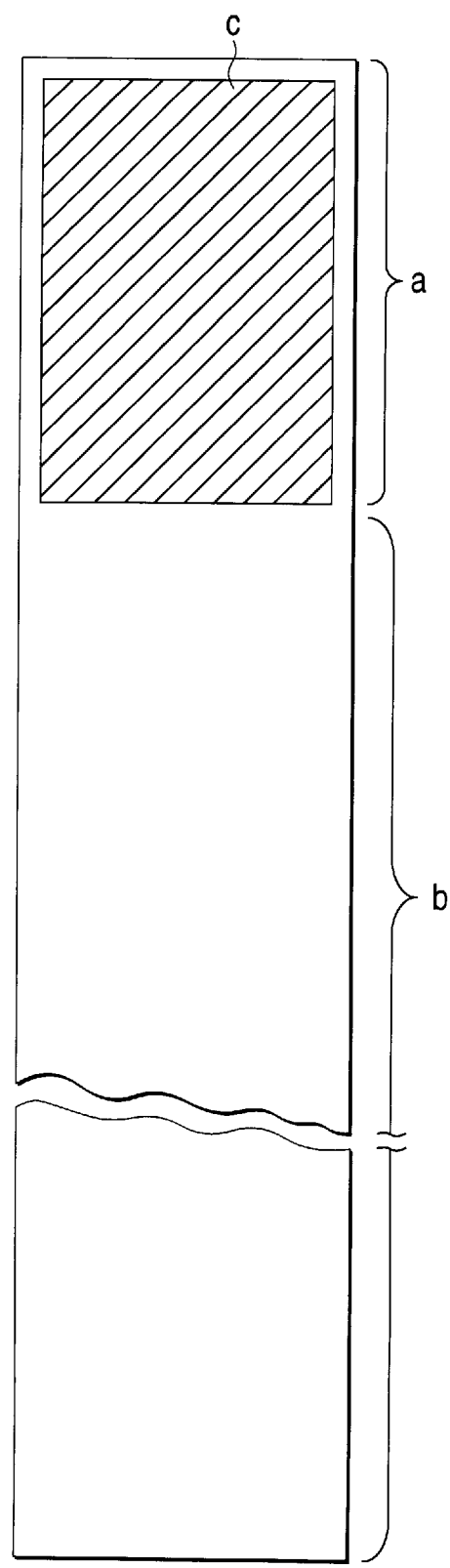
FIG. 1 is an illustration showing a negative electrode sheet pressed with lithium foil, which is used in Example 1.

The following describes the present invention further in detail with reference to illustrative examples, but the present invention is not restricted by these examples without overstepping the gist of the invention.

EXAMPLE 1

Synthesis of Negative Electrode Material-a

An 80.8 g of SnO was dry-blended with 30 g of $SiO_2$, 5.1 g of $Al_2O_3$, 10.4 g of $B_2O_3$ and 41.4 g of $Sn_2P_2O_7$, and the mixture was put into an aluminum crucible and heated to 1,000° C. at a rate of 15° C./minute in an atmosphere of argon. After calcined at 1,000° C. for 12 hours, it was cooled down to room temperature at a rate of 10° C./minute and taken out from the calcining furnace to obtain a glassy compound. Said compound was roughly pulverized using a jaw crusher to obtain a roughly pulverized material having an average particle size of 80 μm. The thus roughly pulverized material was subjected to dry pulverization at room temperature using a spinning air flow type jet mill and then to classification by a cyclone, thereby obtaining a negative electrode material-a having an average particle size of 5.3 μm.

When the thus obtained compound was analyzed by an X-ray diffraction method (Cu-Kα rays), crystal-specific peaks were not found. As a result, it is confirmed that it was an amorphous compound.

Also, measurement of the atomic composition of the thus synthesized compound by an inductive coupling plasma emission spectral analysis confirmed that it was synthesized with the intended atomic composition ratio.

Synthesis of Negative Electrode Material-b

A 13.5 g of tin monoxide was dry-blended with 6.0 g of silicon dioxide using a ball mill. Next, the mixture was put into an aluminum crucible, heated to 1,000° C. at a rate of 15° C./minute in an atmosphere of argon and then, after 12 hours of calcining at 1,000° C., cooled down to room temperature at a rate of 10° C./minute in an atmosphere of argon to obtain a glassy compound. Said compound was roughly pulverized using a jaw crusher to obtain a roughly pulverized material having an average particle size of 80 μm.

Thereafter, a negative electrode material-b having an average particle size of 5.5 μm was obtained in the same manner as the case of the negative electrode material-a. It was confirmed by the same techniques of the case of the negative electrode material-a that said negative electrode material-b was amorphous and synthesized with the intended atomic composition ratio.

Negative Electrode Material-c

A commercially available petroleum coke (PC—R, manufactured by Nippon Petroleum) was used as a carbonaceous negative electrode material.

Negative Electrode Material-d

A commercially available silicon dioxide (silicic anhydride, manufactured by Wako Pure Chemical Industries) was used as a negative electrode material mainly comprising silicon.

The positive electrode active material used herein is a commercial product of $LiCoO_2$.

Electrolytic solutions of the following compositions were used in this example.

|  | EC | DEC | BC | PC | $LiPF_6$ | $LiBF_4$ |
|---|---|---|---|---|---|---|
| (1) | 2 | 8 | 0 | 0 | 1 M | 0 |
| (2) | 2 | 8 | 0 | 0 | 0.95 M | 0.05 M |
| (3) | 5 | 5 | 0 | 0 | 1 M | 0 |
| (4) | 2 | 6 | 2 | 0 | 1 M | 0 |
| (5) | 2 | 6 | 0 | 2 | 1 M | 0 |
| (6) | 2 | 6 | 0 | 2 | 0.95 M | 0.05 M |

EC: ethylene carbonate
DEC: diethyl carbonate
BC: butylene carbonate
PC: propylene carbonate
Each number represents volume ratio and M represents mol/liter.

A lithium foil of 200 μm in thickness and 39 mm in width was purchased and used by cutting it to a predetermined length.

Preparation of Positive Electrode Sheet

As the positive electrode active material, $LiCoO_2$, acetylene black, polytetrafluoroethylene and sodium polyacrylate were mixed at a ratio of 92:4:3:1 and kneaded using water as a medium, and the thus obtained slurry was coated on both sides of an aluminum foil (support) current collector having a thickness of 20 μm. The thus coated material was dried and then subjected to compression molding using a calender press, thereby obtaining a strip-shaped positive electrode sheet. A lead plate was attached to a terminal of the positive electrode sheet by spot welding and then the sheet was subjected to heat treatment for 30 minutes at 210° C. in dry air having a dew point of −40° C. or less.

Preparation of Sheets of the Present Invention
Negative Electrode Sheet (a-1) of the Present Invention Each of various negative electrode materials prepared in accordance with the aforementioned method, acetylene black, graphite, polyvinylidene fluoride and carboxymethylcellulose were mixed at a ratio of 84:3:8:4:1 and kneaded using water as a medium to obtain a slurry. The thus obtained slurry was coated on both sides of a copper foil having a thickness of 18 $\mu$m using a doctor blade coater, dried and then subjected to compression molding using a calender press, and a lead plate was attached to a terminal of the resulting sheet by spot welding. In this case, an uncoated portion of 4 cm in width was arranged on its outermost peripheral. Thereafter, the sheet was subjected to heat treatment for 30 minutes at 210° C. in dry air having a dew point of −40° C. or less, thereby obtaining a strip-shaped negative electrode sheet. In this case, a lithium foil cut to 4.0 cm in width was pressed on said uncoated portion using a roller. Conditions of the negative electrode sheet obtained in this manner are shown in FIG. 1. In FIG. 1, "a" is the outermost peripheral of the negative electrode, "b" is a portion coated with the negative electrode material and "c" is a portion pressed with a metallic lithium foil.

Preparation of Sheet for Comparison Use (s-1)

A negative sheet was prepared in the same manner as the case of the sheet of the present invention, except that the metallic lithium foil was not pressed.

Preparation of Sheet for Comparison Use (s-3)

Petroleum coak, acetylene black, polyvinylidene fluoride and carboxymethylcellulose were mixed at a ratio of 92:3:4:1 and kneaded using water as a medium to obtain a slurry. The thus obtained slurry was coated on both sides of a copper foil having a thickness of 18 $\mu$m using a doctor blade coater, dried and then subjected to compression molding using a calender press, and a lead plate was attached to a terminal of the resulting sheet by spot welding. In this case, an uncoated portion of 4 cm in width was arranged on its outermost peripheral. Thereafter, the sheet was subjected to heat treatment for 30 minutes at 210° C. in dry air having a dew point of −40° C. or less, thereby obtaining a strip-shaped negative electrode sheet. In this case, a lithium foil cut to 0.6 cm in width was pressed on the uncoated portion (copper foil portion) of the thus obtained sheet using a roller.

Sheet for Comparison Use (s-4)

A negative sheet was prepared in the same manner as the case of the sheet for comparison use (s-3), except that the metallic lithium foil was not pressed.

Figure 2:
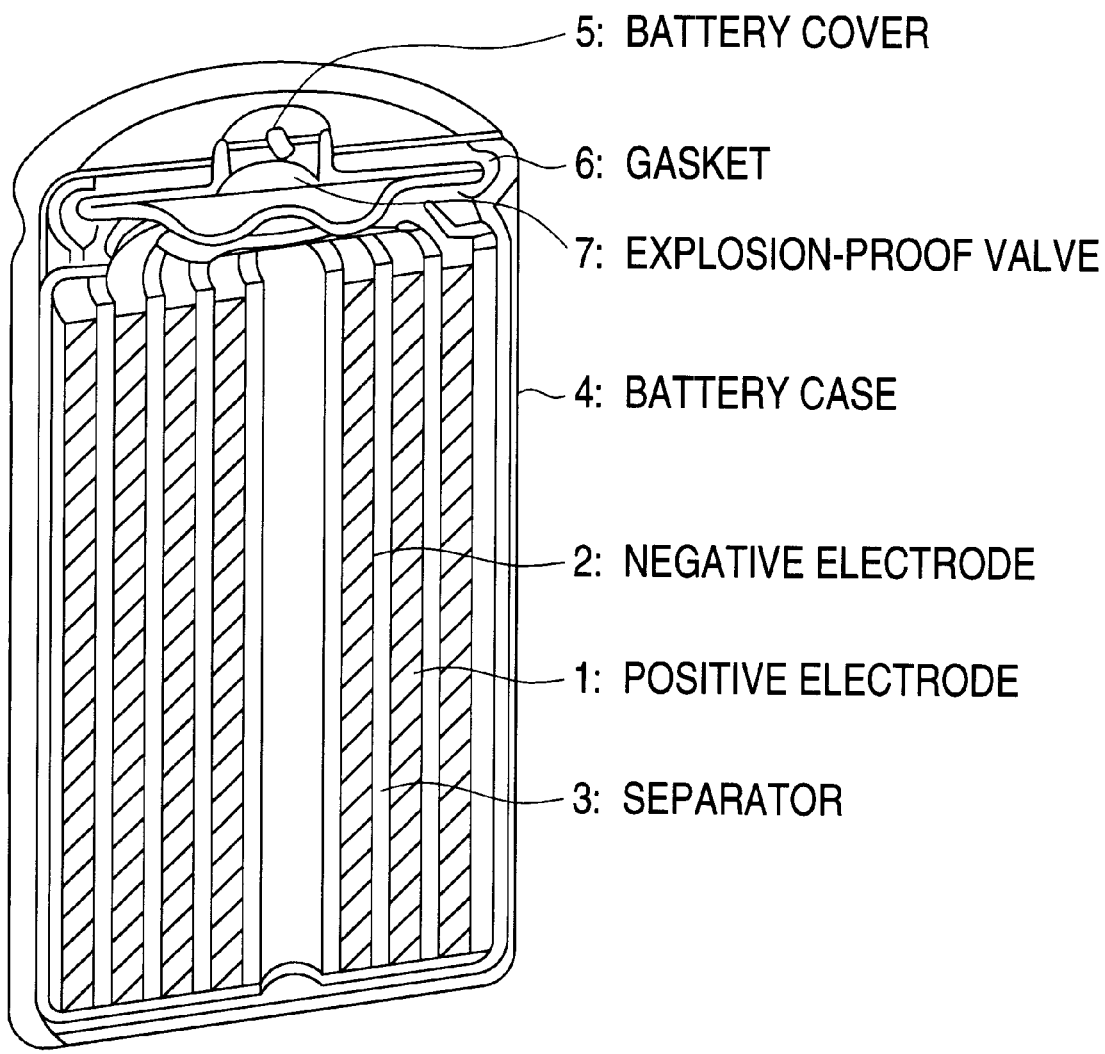
FIG. 2 is a longitudinal sectional view of a general cylinder type battery.

After laminating the prepared positive electrode sheet, a separator made of a micro-porous polypropylene film in that order, they were coiled in a spiral form. In this case, they were coiled in such a way that the side on which the metallic lithium foil was pressed faced central part of the coiled group. The coiled group was put into a bottomed cylinder type battery case, which also serves as a negative electrode terminal, made of iron which has been plated with nickel. 2 cc of the aforementioned electrolytic solution was injected into the battery case. A battery cover having a positive electrode terminal was cramped via a gasket 6 to produce a cylinder type battery. In this case, the positive electrode terminal was connected with the positive electrode sheet, and the battery case with the negative electrode sheet, in advance using lead terminals. A sectional view of the cylinder type battery is shown in FIG. 2. In this drawing, 7 represents an explosion-proof valve. The battery was then allowed to stand for 7 days at 40° C. to carry out the following performance evaluation.

The thus prepared battery was subjected to one cycle of charging and discharging at a charging final voltage of 4.15 V, a discharging final voltage of 2.8 V and a current density of 1 mA/cm$^2$. Ratio of the charging capacity to the discharging capacity was used as a Coulomb efficiency. Thereafter, charging and discharging was repeated 5 cycles at a charging final voltage of 4.15 V, a discharging final voltage of 2.8 V and a current density of 3.5 mA/c$^2$, and then the discharging capacity was measured as a value when charged to a charging final voltage of 4.15 V at a current density of 3.5 mA/cm$^2$ and then discharged to a discharging final voltage of 2.8 V at a current density of 0.7 mA/cm$^2$. The cycle test was evaluated at a charging final voltage of 4.15 V, a discharging final voltage of 2.8 V and a current density of 3.5 mA/cm$^2$. In this case, the cycle test was started from charging. The cycle characteristics were expressed as the number of cycles when the discharging capacity reached 70% of the first discharging. The results are shown in Tables 1 to 3.

TABLE 1

(s-1), (s-3) and (s-4) in Table 1 each represents a negative electrode sheet.

| No. | Negative material*1 | Ratio *2 | Elec. soln*3 | Coulomb eff.*4 | Capacity (wh) | Cycle *5 |     |
|-----|---------------------|----------|--------------|----------------|---------------|----------|-----|
| 1   | c (s-4)             | 1.45     | (1)          | 0.80           | 1.21          | 220      | C.E.|
| 2   | c (s-4)             | 1.45     | (3)          | 0.81           | 1.22          | 240      | C.E.|
| 3   | c (s-3)             | 1.16     | (1)          | 0.98           | 1.34          | 210      | C.E.|
| 4   | c (s-3)             | 1.16     | (3)          | 0.99           | 1.35          | 220      | C.E.|
| 5   | a (s-1)             | 5.7      | (1)          | 0.55           | 2.20          | 384      | C.E.|
| 6   | a (s-1)             | 5.7      | (2)          | 0.57           | 2.25          | 522      | C.E.|
| 7   | a (s-1)             | 5.7      | (3)          | 0.54           | 2.18          | 403      | C.E.|
| 8   | a (s-1)             | 5.7      | (4)          | 0.55           | 2.20          | 382      | C.E.|
| 9   | a (s-1)             | 5.7      | (5)          | 0.55           | 2.20          | 567      | C.E.|
| 10  | a (s-1)             | 5.7      | (6)          | 0.56           | 2.23          | 544      | C.E.|
| 11  | b (s-1)             | 5.7      | (1)          | 0.56           | 2.30          | 256      | C.E.|
| 12  | b (s-1)             | 5.7      | (2)          | 0.56           | 2.30          | 331      | C.E.|

*1: negative electrode material used,
*2: weight ratio of positive electrode active material to negative electrode material,
*3: electrolytic solution,
*4: Coulomb efficiency,
*5: cycle characteristics,
C.E.: comparative example
Nos. 1 and 2: Amount of LiCoO$_2$ facing negative electrode is 3.36 g, amount of carbon facing positive electrode is 2.31 g.
Nos. 3 and 4: Amount of LiCoO$_2$ facing negative electrode is 2.86 g, amount of carbon facing positive electrode is 2.46 g, lithium foil cut to 0.7 cm is pressed.
Nos. 5 to 16: Negative electrode material contained in unit battery is 1.36 g, and that of LiCoO$_2$ is 7.75 g.

TABLE 2

(s-1) in Table 2 represents a negative electrode sheet.

| No. | Negative material*1 | Ratio *2 | Elec. soln*3 | Coulomb eff.*4 | Capacity (wh) | Cycle *5 |     |
|-----|---------------------|----------|--------------|----------------|---------------|----------|-----|
| 13  | b (s-1)             | 5.7      | (3)          | 0.56           | 2.30          | 267      | C.E.|
| 14  | b (s-1)             | 5.7      | (4)          | 0.54           | 2.28          | 243      | C.E.|
| 15  | b (s-1)             | 5.7      | (5)          | 0.56           | 2.32          | 268      | C.E.|
| 16  | b (s-1)             | 5.7      | (6)          | 0.55           | 2.30          | 241      | C.E.|
| 17  | a (s-1)             | 3.1      | (1)          | 0.42           | 1.59          | 226      | C.E.|
| 18  | a (s-1)             | 3.1      | (2)          | 0.41           | 1.57          | 226      | C.E.|
| 19  | a (s-1)             | 3.1      | (3)          | 0.42           | 1.59          | 211      | C.E.|
| 20  | a (s-1)             | 3.1      | (4)          | 0.43           | 1.60          | 217      | C.E.|
| 21  | a (s-1)             | 3.1      | (5)          | 0.42           | 1.59          | 190      | C.E.|
| 22  | a (s-1)             | 3.1      | (6)          | 0.41           | 1.57          | 201      | C.E.|
| 23  | b (s-1)             | 3.1      | (1)          | 0.43           | 1.67          | 106      | C.E.|
| 24  | b (s-1)             | 3.1      | (2)          | 0.41           | 1.65          | 98       | C.E.|

*1 to *5 and C.E.: see Table 1
Nos. 17 to 40: Negative electrode material contained in unit battery is 1.9 g, and that of LiCoO$_2$ is 5.9 g.

TABLE 2-continued (s-1) in Table 2 represents a negative electrode sheet.

| No. | Negative material*1 | Ratio *2 | Elec. soln*3 | Coulomb eff.*4 | Capacity (wh) | Cycle *5 |
|---|---|---|---|---|---|---|

Nos. 29 to 40: Lithium foil cut to 4.0 cm was pressed on negative electrode collector sheet.

TABLE 3

| No. | Negative material*1 (*6) | Ratio *2 | Elec. soln*3 | Coulomb eff.*4 | Capacity (wh) | Cycle *5 |
|---|---|---|---|---|---|---|
| 25 | b (s-1) | 3.1 | (3) | 0.42 | 1.66 | 85 C.E. |
| 26 | b (s-1 | 3.1 | (4) | 0.42 | 1.66 | 73 C.E. |
| 27 | b (s-1 | 3.1 | (5) | 0.41 | 1.65 | 102 C.E. |
| 28 | b (s-1 | 3.1 | (6) | 0.42 | 1.66 | 86 C.E. |
| 29 | a (a-1) | 3.1 | (1) | 0.95 | 3.01 | 620 I.E |
| 30 | a (a-1) | 3.1 | (2) | 0.98 | 3.03 | 667 I.E |
| 31 | a (a-1) | 3.1 | (3) | 0.96 | 3.02 | 640 I.E |
| 32 | a (a-1) | 3.1 | (4) | 0.94 | 2.98 | 604 I.E |
| 33 | a (a-1) | 3.1 | (5) | 0.98 | 2.97 | 692 I.E |
| 34 | a (a-1) | 3.1 | (6) | 0.97 | 3.01 | 630 I.E |
| 35 | b (a-1) | 3.1 | (1) | 0.96 | 3.10 | 324 I.E. |
| 36 | b (a-1) | 3.1 | (2) | 0.94 | 3.09 | 302 I.E. |
| 37 | b (a-1) | 3.1 | (3) | 0.96 | 3.11 | 306 I.E. |
| 38 | b (a-1) | 3.1 | (4) | 0.96 | 3.11 | 319 I.E. |
| 39 | b (a-1) | 3.1 | (5) | 0.94 | 3.09 | 310 I.E. |
| 40 | b (a-1) | 3.1 | (6) | 0.96 | 3.11 | 321 I.E |

*1 to *5, and C.E.: see Table 1, I.E.: inventive example, (*6): negative electrode sheet,
No. 41: Amount of $LiCoO_2$ facing negative electrode is 1.36 g, silicon dioxide facing positive electrode is 3.02 g.
Nos. 42 and 43: Amount of $LiCoO_2$ facing negative electrode is 0.82 g, silicon dioxide facing positive electrode is 3.15 g, lithium foil cut to 6 mm is pressed.

When a carbonaceous negative electrode material was used, a battery having well-balanced cycle characteristics, capacity and the like was obtained by using 1.45 times of the positive electrode active material based on the negative electrode material. In this case, the capacity was around 1.2 Wh as shown in Table 1, but improvement of the capacity by the topping of lithium foil was merely about 0.1 Wh at the maximum.

When the negative electrode material "a" or "b" is used without applying metallic lithium foil, a battery having most improved balance of cyclic characteristics with capacity can be obtained by using $LiCoO_2$ of the positive electrode active material in an amount of 5.7 times (by weight) of said negative electrode material. The capacity is 2.2 Wh which is higher than the case of carbonaceous negative electrode material by a factor of 1.0 Wh, but the Coulomb efficiency is around 0.55 which means that about half of the added $LiCoO_2$ is consumed by side reactions of the negative electrode material (Nos. 5 to 16 in Table 2). However, in the batteries of the present invention in which metallic lithium foil was pressed on the negative electrode sheet in such an amount that Coulomb efficiency became around 1.0, ratio of the positive electrode active material to the negative electrode material was able to be reduced to 3.1 as shown in Nos. 29 to 40 of Table 3. As the results, it was able to introduce various negative electrode materials into batteries, and the capacity was improved to a surprisingly high level of 36% (about 1.0 Wh). More surprisingly, the cycle performance was also improved. On the other hand, when the ratio of positive electrode active material to negative electrode material was set to 3.1 without applying metallic lithium foil, the capacity was reduced to 28% and the cycle performance was also deteriorated as shown in Nos. 13 to 24 of Table 1.

JP-A-6-325765 discloses use of lithium or a lithium alloy in a system in which a lithium-containing silicon oxide or silicic acid salt is used as the negative electrode material. Its specification discloses a method in which lithium foil punched into almost the same size of a pelletized negative electrode material is directly pressed on the material in a coin type battery. In accordance with this method, a cylinder type battery in which silicon dioxide was used in the negative electrode material was prepared, by pressing lithium foil directly on the coated portion of the negative electrode material, and the battery performance was evaluated. Another battery in which lithium foil was pressed on an uncoated portion of the outermost peripheral of the negative electrode material was prepared in the same manner of the present invention and evaluated in the same manner. As the results, the capacity when silicon dioxide was used as the negative electrode material was 0.41 Wh as shown in No. 41 of Table 3. When pressed on the current collector metal similar to the case of the present invention, the capacity improved by the introduction of lithium foil was merely 0.03 Wh at the maximum as shown in No. 42 of Table 3. Capacity improving effect was not found when lithium foil was directly pressed on the negative electrode material.

EXAMPLE 2

Negative Electrode Material

The negative electrode materials "a" and "b" described in Example 1 were used.

Preparation of Positive Electrode Sheet

Prepared in the same manner as described in Example 1. In this case, weight of $LiCoO_2$ on the positive electrode sheet was 5.9 g.

Preparation of Negative Electrode Sheet

Each of various negative electrode materials prepared in accordance with the aforementioned method, acetylene black, graphite, polyvinylidene fluoride and carboxymethylcellulose were mixed at a ratio of 84:3:8:4:1 and kneaded using water as a medium to obtain a slurry.

The thus obtained slurry was coated on both sides of a copper foil having a thickness of 18 $\mu$m using a doctor blade coater, dried and then subjected to compression molding using a calender press, the resulting sheet was slit into a strip of 41 mm in width and 300 mm in length, and a lead plate was attached to a terminal of the negative electrode sheet by spot welding. Thereafter, the sheet was subjected to heat treatment for 30 minutes at 210° C. in dry air having a dew point of −40° C. or less, thereby obtaining a strip-shaped negative electrode sheet. Weight of the negative electrode material on the negative electrode sheet was 1.9 g. A lithium foil having a thickness of 40 $\mu$m was cut to four pieces each having 9 mm in width and 22 cm in length (correspond to 13.7 g/m² of negative electrode sheet), and two of them were pressed on each side of the negative electrode sheet using a roller.

Preparation of Sheet for Comparison Use—1

A negative electrode sheet was prepared in the same manner as the case of the sheet of the present invention, except that the metallic lithium foil was not pressed.

Preparation of Sheet for Comparison Use—2

A negative electrode sheet was prepared in the same manner as the case of the present invention, except that a lithium foil having a thickness of 100 $\mu$m was cut to four pieces each having 9 mm in width and 22 cm in length (correspond to 34.3 g/m² of negative electrode sheet), and two of them were pressed on each side of the negative electrode sheet using a roller.

Preparation of Sheet for Comparison Use—3

When a nonaqueous secondary battery is produced using the negative electrode material "a" or "b" and the positive electrode active material $LiCoO_2$, the ratio "positive electrode active material/negative electrode material" (to be referred to as "C/A" hereinafter) exerts great influence upon the balance of cycle characteristics with capacity. When metallic lithium foil is used in the aforementioned amount, C/A=3.1 is desirable, but, when metallic lithium foil is not used, C/A=5.7 rather than C/A=3.1 is effective in obtaining a battery having most balanced cycle characteristics and capacity.

In order to correctly evaluate cycle characteristics and capacity of a nonaqueous secondary battery produced using the negative electrode material "a" or "b" and the positive electrode active material $LiCoO_2$, but not using metallic lithium foil, the aforementioned electrode sheet was adjusted to such a length that the negative electrode material and the positive electrode active material $LiCoO_2$ became 1.36 g and 7.75 g, respectively, thereby obtaining a ratio of C/A=5.7.

Next, a battery was prepared in the same manner as described in Example 1.

The thus prepared battery was subjected to one cycle of charging and discharging at a charging final voltage of 4.15 V, a discharging final voltage of 2.8 V and a current density of 1 $mA/cm^2$. Ratio of the charging capacity to the discharging capacity was used as a Coulomb efficiency. Thereafter, charging and discharging was repeated 5 cycles at a charging final voltage of 4.15 V, a discharging final voltage of 2.8 V and a current density of 3.5 $mA/cm^2$, and then the discharging capacity was measured as a value when charged to a charging final voltage of 4.15 V at a current density of 3.5 $mA/cm^2$ and then discharged to a discharging final voltage of 2.8 V at a current density of 0.7 $mA/cm^2$. The cycle test was evaluated at a charging final voltage of 4.15 V, a discharging final voltage of 2.8 V and a current density of 3.5 $mA/cm^2$. In this case, the cycle test was started from charging. The cycle characteristics were expressed as the number of cycles when the discharging capacity reached 70% of the first discharging. The results are shown in Table 4. As is apparent from the results shown in Table 4, Nos. 1 and 2 in which 13.7 $g/m^2$ of lithium was pre-intercalated into the negative electrode sheet are greatly superior in cycle characteristics to Nos. 3 and 4 in which 34.3 $g/m^2$ of lithium was pre-intercalated into the negative electrode sheet. In addition, they are excellent in Coulomb efficiency, capacity and cycle characteristics which are the basic performance as a practical battery, in comparison with the batteries in which lithium was not pre-intercalated into the negative electrode sheet, namely not only Nos. 5 and 6 which have the same construction but also Nos. 7 and 8 which are batteries having an optimized C/A ratio of 5.7 taking balance of cycle characteristics with capacity into consideration.

TABLE 4

| No. | Negative elec. *1 | Li *2 ($g/m^2$) | C/A | Coulomb (%) *3 | Capacity (Wh) | Cycle (time) *4 | Remarks *5 |
|---|---|---|---|---|---|---|---|
| 1 | a | 13.7 | 3.1 | 0.98 | 2.97 | 567 | I.E. |
| 2 | b | " | " | 0.94 | 2.87 | 518 | " |
| 3 | a | 34.3 | " | 0.83 | 2.44 | 158 | C.E. |
| 4 | b | " | " | 0.84 | 2.31 | 98 | " |
| 5 | a | — | " | 0.43 | 1.41 | 284 | " |
| 6 | b | — | " | 0.41 | 1.36 | 258 | " |
| 7 | a | — | 5.7 | 0.57 | 2.10 | 39 | " |
| 8 | b | — | " | 0.56 | 2.30 | 328 | " |

*1: negative electrode material,
*2: amount of pre-intercalated lithium,
*3: Coulomb efficiency,
*4: cycle characteristics,
*5: I.E., inventive example; C.E., comparative example

EXAMPLE 3

Figure 3:
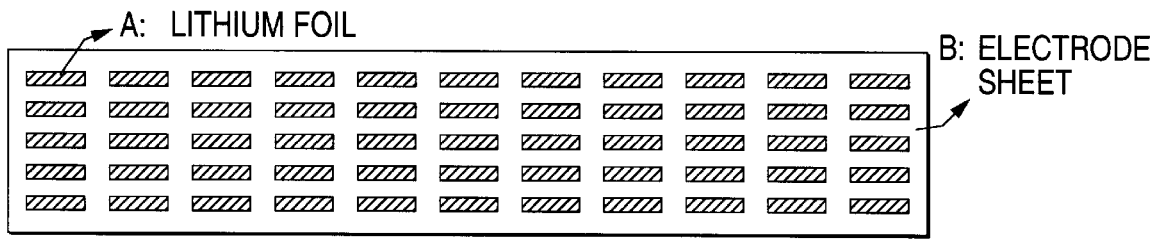
FIG. 3 is an illustration showing an example of the adhesion of Li foil pieces on the negative electrode sheet.
Figure 3:
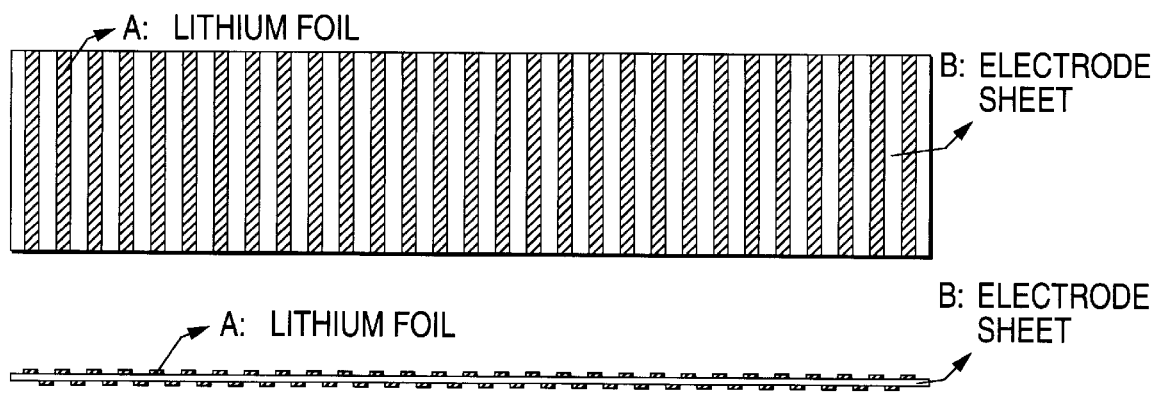
Figure 3:
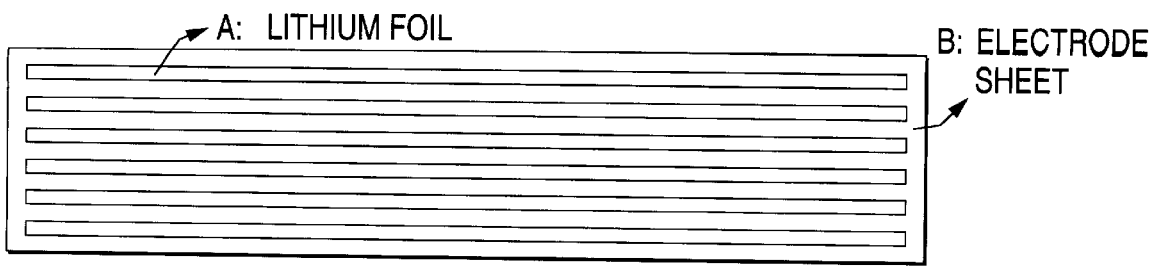

A total of 25 Li foil pieces, each having a thickness of 40 μm, a width of 3.9 mm and a length of 41 mm, were arranged on each side of the same negative electrode sheet of Example 2 at regular intervals in a stripe shape (FIG. 3(b)) and adhered by pressing them with a roller (corresponding to 13.8 $g/m^2$ per negative electrode sheet). Using the thus obtained negative electrode sheet, batteries were prepared in the same manner as described in Example 1 and allowed to stand at 40° C. for 2 days to evaluate their performance in the same manner as described in Example 1. As the results, it was revealed that the batteries of Nos. 9 and 10 shown in Table 5 have superior Coulomb efficiency, capacity and cycle characteristics in comparison with the comparative examples 7 and 8 shown in Table 4 which have the same construction.

TABLE 5

| No. | Negative elec. *1 | Li *2 ($g/m^2$) | C/A | Coulomb (%) *3 | Capacity (Wh) | Cycle (time) *4 | Remarks *5 |
|---|---|---|---|---|---|---|---|
| 9 | a | 13.8 | 3.1 | 0.98 | 3.02 | 601 | I.E. |
| 10 | b | " | " | 0.95 | 2.93 | 557 | " |

*1: negative electrode material,
*2: amount of pre-intercalated lithium,
*3: Coulomb efficiency,
*4: cycle characteristics,
*5: I.E., inventive example; C.E., comparative example

EXAMPLE 4

Through a polyethylene terephthalate (PET) sheet of 50 μm in thickness were bored rectangular holes of 4 mm×10 mm, 5 holes within 40 mm in cross direction and 20 holes over 22 cm in longitudinal direction, 100 holes in total. Next, the thus prepared sheet was interposed between the same negative electrode sheet of Example 1 and a Li foil of 40 μm in thickness and compressed strongly with a roller to effect pressing of the Li foil on portions of the negative electrode sheet corresponding to the holes bored through PET (corresponding to 13.8 g/m$^2$ per negative electrode sheet). The thus prepared batteries 11 and 12 and 13 and 14 were allowed to stand at 40° C. for 2 days and at 40° C. for 15 days, respectively, to carry out performance evaluation in the same manner as described in Example 1. As the results, it was confirmed that these batteries 11 to 14 as shown in Table 6 have superior Coulomb efficiency, capacity and cycle characteristics in comparison with the comparative examples 7 and 8 which have the same construction.

TABLE 6

| No. | Negative elec. *1 | Li *2 (g/m$^2$) | C/A | Coulomb (%) *3 | Capacity (Wh) | Cycle (time) *4 | Remarks *5 |
|---|---|---|---|---|---|---|---|
| 11 | a | 13.8 | 3.1 | 0.97 | 2.98 | 590 | I.E. |
| 12 | b | " | " | 0.94 | 2.90 | 544 | " |
| 13 | a | " | " | 0.98 | 3.00 | 590 | " |
| 14 | b | " | " | 0.95 | 2.93 | 545 | " |

*1: negative electrode material,
*2: amouunt of pre-intercalated lithium,
*3: Coulomb efficiency,
*4: cycle characteristics,
*5: I.E., inventive; C.E., comparative example

EXAMPLE 5

A negative electrode sheet was prepared by calcining $Sn_{0.1}P_{0.5}B_{0.5}Al_{0.5}K_{0.1}Mg_{0.1}Ge_{0.1}O_{4.1}$ in the same manner as described in Example 2. To this was adhered Li foil in the same manner as described in Example 2. As the results, they showed excellent Coulomb efficiency, capacity and cycle characteristics similar to the case of Example 3.

For the sake of comparison, petroleum coke, acetylene black, polyvinylidene fluoride and carboxymethylcellulose were mixed at a weight ratio of 92:3:4:1 and kneaded using water as the medium, and the resulting slurry was subjected to the same procedure of Example 2 to prepare a carbon negative electrode sheet and to obtain a battery. When amounts of the positive electrode active material and negative electrode material were optimized in this system, the capacity was 1.21 Wh and the room temperature cycle characteristic was 220. When pressing of Li foil as a technique of the present invention was applied to the carbon negative electrode sheet, increase in the capacity was only 0.1 Wh, and improvement in the cycle characteristics was not found.

EXAMPLE 6

Synthesis Example

A 13.5 g portion of tin monoxide was dry-blended with 3.6 g of silicon dioxide, 0.64 g of magnesium oxide and 0.69 g of boron oxide, and the mixture was put into an aluminum crucible and heated to 1,000° C. at a rate of 15° C./minute in an atmosphere of argon. After 10 hours of calcining at 1,200° C., this was cooled down to room temperature at a rate of 10° C./minute, taken out from the furnace, roughly pulverized and then pulverized using a jet mill to obtain $SnSi_{0.6}Mg_{0.2}B_{0.2}O_{2.7}$ (Compound 1-A) having an average particle size of 4.5 μm. When analyzed by an X-ray diffraction analysis using CuKα rays, it was found that this compound has a broad peak with the highest peak at 28° as the 2θ value, but with no crystalline diffraction lines within 40° to 70° as the 2θ value.

The same procedure was repeated to obtain the following compounds by mixing respective materials in stoichiometric amounts, and calcining and pulverizing the mixtures. $SnSi_{0.8}Mg_{0.2}O_{2.8}$ (1-B), $SnSi_{0.6}Al_{0.2}Mg_{0.2}O_{2.7}$ (1-C), $SnSi_{0.6}P_{0.2}Mg_{0.2}O_{2.9}$ (1-D), $SnSi_{0.6}Al_{0.1}B_{0.2}Mg_{0.1}O_{2.75}$ (1-E) and $SnSi_{0.5}P_{0.1}B_{0.1}Mg_{0.3}O_{2.7}$ (1-F).

The Compound 1-A synthesized in Synthesis Example was used as a negative electrode material, and 88% by weight of the compound was mixed with 6% by weight of scale shape graphite and then with 4% by weight of polyvinylidene fluoride dispersed in water and 1% by weight of carboxymethylcellulose as binders and 1% by weight of lithium acetate, and the resulting mixture was kneaded using water as the medium to prepare a slurry. The thus prepared slurry was coated on both sides of copper foil having a thickness of 18 μm by an extrusion method to obtain a negative electrode a.

Negative electrodes b-1 to b-7 having auxiliary layers were obtained by mixing electrically conductive particles and the like ingredients at respective ratio shown in Table 7, kneading the mixture using water as the medium and then coating the resulting slurry on the negative electrode a in such an amount that thickness of the auxiliary layer after drying became 10 μm.

Each of these negative electrodes a and b-1 to b-7 was dried, subjected to compression molding using a calender press and then cut to predetermined width and length to obtain negative electrode sheets a and b-1 to b-7 in a strip form. Width and length of the negative electrode sheet were adjusted to such levels that coating amount of the Compound 1-A became 1.9 g.

Each of the thus obtained negative electrode sheets was equipped with a nickel lead plate by spot welding and subjected to dehydration drying for 30 minutes at 230° C. in the air having a dew point of −40° C. or less, and then 2 pieces of lithium foil, each having a thickness of 40 μm, a length of 22 cm and a width of 9 mm, were pressed on each side of the thus treated negative electrode sheet using a roller.

As the positive electrode material, 87% by weight of $LiCoO_2$ was mixed with 6% by weight of scale-form graphite, 3% by weight of acetylene black and, as binders, 3% by weight of polytetrafluoroethylene dispersed in water and 1% by weight of sodium polyacrylate, the mixture was kneaded using water as the medium and then the resulting slurry was coated on both sides of aluminum foil having a thickness of 20 μm by the aforementioned method to obtain a positive electrode a.

Positive electrodes b-1 to b-7 having auxiliary layers were prepared by coating respective slurries of electrically conductive particles and the like having compositions shown in Table 1 on the positive electrode a in such amount that the protective layer after drying became 15 μm, in the same manner as the case of the negative electrodes.

These positive electrodes a and b-1 to b-7 were dried, pressed and then cut to obtain positive electrode sheets a and b-1 to b-7. Coating amount of $LiCoO_2$ on the positive electrode sheet was 5.9 g in weight. Each of the thus obtained positive electrode sheets was equipped with an aluminum lead plate by spot welding and then subjected to dehydration drying for 30 minutes at 230° C. in dry air having a dew point of −40° C. or less.

Thickness of the positive electrode sheet a was 250 μm and that of the positive electrode sheets b-1 to b-7 was 265 μm.

TABLE 7

(Compositions of auxiliary and protective layers)

| | Mixing ratio of solid component (wt %) | | | | | | |
|---|---|---|---|---|---|---|---|
| | b-1 | b-2 | b-3 | b-4 | b-5 | b-6 | b-7 |
| Conductive particles | | | | | | | |
| scale graphite 3.5 μm | 2 | 0 | 0 | 2 | 20 | 20 | 35 |
| acetylene black 0.2 μm | 0 | 2 | 0 | 0 | 0 | 0 | 0 |
| nickel powder 2.0 μm | 0 | 0 | 2 | 0 | 0 | 0 | 0 |
| α-Alumina | 87 | 87 | 87 | 0 | 78 | 0 | 63 |
| Zirconia | 0 | 0 | 0 | 87 | 0 | 78 | 0 |
| Polyvinylidene fluoride | 9 | 9 | 9 | 9 | 0 | 0 | 0 |
| Carboxymethyl-cellulose | 2 | 2 | 2 | 2 | 2 | 2 | 2 |
| Total | 100 | 100 | 100 | 100 | 100 | 100 | 100 |

The aforementioned negative electrode sheets and positive electrode sheets were combined as shown in Table 2 to prepare a Battery A (comparative) and Batteries B (invention).

Ten batteries were prepared for each of the Battery A (comparative) and Batteries B-1 to B-6 (invention), charged to 4.15 V at 1 mA/cm² and then stored at 60° C. for 3 weeks. After 3 weeks of the storage, open circuit voltage of each battery was measured, with the results shown in Table 8.

TABLE 8

| Battery type | Negative sheet *1 | Positive sheet *2 | Open voltage *3 | Voltage fluctuation *4 |
|---|---|---|---|---|
| A (comparison) | a | a | 0.87 V | 0.41 |
| B-1 (invention) | b-1 | b-1 | 4.13 | 0.01 |
| B-2 (invention) | b-2 | b-2 | 4.12 | 0.01 |
| B-3 (invention) | b-3 | b-3 | 4.12 | 0.01 |
| B-4 (invention) | b-4 | b-4 | 4.11 | 0.01 |
| B-5 (invention) | b-5 | b-5 | 4.13 | 0.01 |
| B-6 (invention) | b-6 | b-6 | 4.12 | 0.01 |
| B-7 (invention) | b-7 | b-7 | 4.12 | 0.01 |
| B-8 (invention) | b-1 | a | 4.10 | 0.02 |
| B-9 (invention) | b-4 | a | 4.09 | 0.02 |

TABLE 8-continued

| Battery type | Negative sheet *1 | Positive sheet *2 | Open voltage *3 | Voltage fluctuation *4 |
|---|---|---|---|---|
| B-10 (invention) | b-5 | a | 4.08 | 0.03 |
| B-11 (invention) | b-7 | a | 4.08 | 0.02 |

*1: negative electrode sheet
*2: positive electrode sheet
*3: open circuit voltage, average value
*4: voltage fluctuation, standard deviation The above results show that the batteries of the present invention are evidently small in the voltage drop during storage and their performance therefore is stable.

EXAMPLE 7

A total of 300 copies of each of Batteries A and B-1 to B-11 of Example 6 were prepared and charged to 4.15 V. When they were checked, 6 copies of Battery A for comparison use were poorly charged, but all copies of the Batteries B-1 to B-11 of the present invention were fully charged which clearly showed improvement of the generation of defective products.

EXAMPLE 8

When the same test of Example 6 was carried out by replacing the negative electrode material 1-A used in Example 6 by other materials 1-B to 1-F, almost the same results as in Example 6 were obtained.

EXAMPLE 9

Negative electrode sheets c-1 and c-2 were prepared in the same manner as the negative electrode sheets b-1 and b-7 of Example 6, except that thickness of the auxiliary layer of b-1 and b-7 was changed to 6 μm. Batteries C-1 and C-2 were prepared from these negative electrode sheets in combination with the positive electrode sheet a. When the same test of Example 1 was carried out using the thus prepared Batteries C-1 and C-2, their voltage drop after storage was small similar to the case of the battery B, thus showing their stable performance.

EXAMPLE 9'

When the test of Example 1 was repeated, except that 2 pieces of lithium foil having a thickness of 30 μm, a length of 22 cm and a width of 12 mm were pressed on each side of the negative electrode sheet using a roller, almost the same effects of Example 6 were obtained.

EXAMPLE 10

The negative electrode sheets a and b-1 and positive electrode sheets a and b-1 of Example 6 were used, and one set of the negative electrode sheets a and b-1 were pressed with lithium foil under the same conditions of Example 6, and the other set were used with no pressing. Batteries were prepared from these positive and negative electrode sheets by their combinations shown in the following table in the same manner as described in Example 1 and charged to 4.15 V at 1 mA/cm² to measure their discharging capacity. The discharging capacity was expressed based on Battery D-1. Also, 300 copies of each battery were prepared to find the number of defective batteries in the same manner as described in Example 7. The results are shown in Table 9.

TABLE 9

| Type of battery | Negative sheet *1 | Negative Li *2 | Positive sheet *3 | Capacity *4 | Defective battery *5 |
|---|---|---|---|---|---|
| D-1 | a | no | a | 100 | 8/300 |
| D-2 | a | yes | a | 140 | 7/300 |
| D-3 | b-1 | no | b-1 | 96 | 0/300 |
| D-4 | b-1 | yes | b-1 | 135 | 0/300 |

*1, negative electrode sheet;
*2, Li in negative electrode;
*3, positive electrode sheet;
*4, discharging capacity;
*5, the number of defective batteries The above results show that Battery D-4 of the present invention has high discharging capacity and is excellent in production suitability.

EXAMPLE 11

Predetermined amounts of tin monoxide, alumina, boron oxide, tin pyrophosphate and magnesium fluoride were subjected to dry blending, and the mixture was put into an aluminum crucible and heated to 1,000° C. at a rate of 15° C./minute in an atmosphere of argon. After 10 hours of calcining, this was cooled down to room temperature at a rate of 10° C./minute and taken out from the furnace. The thus obtained sample was roughly pulverized and then pulverized using a jet mill to obtain powder of 6.5 μm in average particle size. When analyzed by an X-ray diffraction analysis using CuKα rays, it was found that this compound has a broad peak with the highest peak at around 28° as the 2θ value, but with no crystalline diffraction lines within 40° to 70° as the 2θ value. Elemental analysis revealed that this compound is $SnAl_{0.1}B_{0.5}P_{0.5}Mg_{0.1}F_{0.2}O_{3.15}$ (Compound G).

A negative electrode sheet 6a was prepared in the same manner as described in Example 6, except that Compound G was used in stead of Compound 1-A of Example 6. Also, a negative electrode sheet 6b having an auxiliary layer was prepared in the same manner as the case of the negative electrode sheet b-1. One set of the negative electrode sheets 6a and 6b on which lithium foil was pressed under the same conditions of Example 6 and another set with no pressing were prepared. Batteries were prepared from these negative electrode sheets in combination with the positive electrode sheet of Example 6 to carry out the same test of Example 10, with the results shown in Table 10.

TABLE 10

| Type of battery | Negative sheet *1 | Negative Li *2 | Positive sheet *3 | Capacity *4 | Defective battery *5 |
|---|---|---|---|---|---|
| E-1 | 6a | no | a | 100 | 7/300 |
| E-2 | 6a | yes | a | 142 | 7/300 |
| E-3 | 6b | no | b-1 | 96 | 1/300 |
| E-4 | 6b | yes | b-1 | 135 | 0/300 |

*1, negative electrode sheet;
*2, Li in negative electrode;
*3, positive electrode sheet;
*4, discharging capacity;
*5, the number of defective batteries The above results show that Battery E-4 of the present invention has high discharging capacity and is excellent in production suitability.

EXAMPLE 12

$Sn_{1.0}P_{0.5}B_{0.5}Al_{0.5}K_{0.1}Mg_{0.1}Ge_{0.1}O_{4.1}$ was calcined in the same manner as described in Example 6, and a negative electrode sheet 7a was prepared by repeating the procedure of Example 6 except that the just described compound was used in stead of Compound 1-A of Example 6. Also, negative electrode sheets 7b-1 to 7b-7 having auxiliary layers were prepared in the same manner as the case of sheets b-1 to b-7 of Example 6, and the negative electrode sheets and positive electrode sheets were used in combinations shown in Table 11. A total of 25 lithium foil pieces having a thickness of 40 μm, a width of 3.9 mm and a length of 41 mm were arranged on each side of the negative electrode sheet at regular intervals in a stripe shape and pressed with a roller to effect their pressing (corresponding to 13.8 g/m² per negative electrode sheet). Batteries were prepared using the thus obtained negative electrode sheets in the same manner as described in Example 1, allowed to stand at 40° C. for 12 days and then checked for their performance in the same manner as described in Example 6. As the results, as shown in Table 11, it was revealed that the batteries of the present invention are small in the voltage drop during storage and their performance therefore is stable.

TABLE 11

| Battery type | Negative sheet *1 | Positive sheet *2 | Open voltage *3 | Voltage fluctuation *4 |
|---|---|---|---|---|
| F (comparison) | a | a | 0.88 V | 0.39 |
| F-1 (invention) | 7b-1 | b-1 | 4.12 | 0.01 |
| F-2 (invention) | 7b-2 | b-2 | 4.12 | 0.01 |
| F-3 (invention) | 7b-3 | b-3 | 4.12 | 0.01 |
| F-4 (invention) | 7b-4 | b-4 | 4.11 | 0.01 |
| F-5 (invention) | 7b-5 | b-5 | 4.12 | 0.01 |
| F-6 (invention) | 7b-6 | b-6 | 4.12 | 0.01 |
| F-7 (invention) | 7b-7 | b-7 | 4.12 | 0.01 |
| F-8 (invention) | 7b-1 | a | 4.11 | 0.02 |
| F-9 (invention) | 7b-4 | a | 4.09 | 0.02 |
| F-10 (invention) | 7b-5 | a | 4.08 | 0.02 |
| F-11 (invention) | 7b-7 | a | 4.08 | 0.02 |

*1: negative electrode sheet
*2: positive electrode sheet
*3: open circuit voltage, average value
*4: voltage fluctuation, standard deviation

EXAMPLE 13

A mixture consisting of 86 weight parts of $SnB_{0.2}P_{0.5}K_{0.1}Mg_{0.1}Ge_{0.1}O_{2.8}$ as a negative electrode material, 3 weight parts of acetylene black as an electrically conductive agent and 6 weight parts of graphite was further mixed with 4 weight parts of polyvinylidene fluoride and 1 weight part of carboxymethylcellulose as binders and then kneaded using water as the medium to obtain a negative electrode mixture slurry. Said slurry was coated on both sides of copper foil having a thickness of 10 μm using an extrusion type coating machine and then dried, thereby obtaining a negative electrode material mixture sheet.

Next, 79 weight parts of α-alumina, 18 weight parts of graphite and 3 weight parts of carboxymethylcellulose were kneaded by adding water as the medium to obtain an auxiliary layer slurry. Said slurry was coated on the just described negative electrode material mixture sheet, dried and then subjected to compression molding by a calender press, thereby preparing a strip-shaped negative electrode sheet precursor having a thickness of 98 μm, a width of 55 mm and a length of 520 mm.

The negative electrode sheet precursor was equipped with a nickel lead plate by spot welding and then subjected to dehydration drying for 30 minutes at 230° C. in the air having a dew point of −40° C. or less.

On each side of the thus obtained sheet were pressed 12 pieces of lithium foil (99.5% in purity) having a thickness of 40 μm which has been cut to a size of 20 mm×55 mm. The pressing was carried out by once transferring the lithium foil pieces onto a polyethylene roller of 300 mm in diameter and then applying a pressure of 5 kg/cm² to both sides of the sheet simultaneously. Covering ratio of the negative electrode sheet with the lithium foil was 40%.

A mixture consisting of 87 weight parts of $LiCoO_2$ as a positive electrode active material, 3 weight parts of acetylene black as an electrically conductive agent and 6 weight parts of graphite was further mixed with 3 weight parts of Nipol1820B (manufactured by Nippon Zeon) and 1 weight part of carboxymethylcellulose as binders, and the mixture was kneaded using water as the medium, thereby obtaining a positive electrode material mixture slurry.

Said slurry was coated on both sides of aluminum foil having a thickness of 20 μm using an extrusion type coating machine, dried and then subjected to compression molding by a calender press, thereby preparing a strip-shaped positive electrode sheet (1) having a thickness of 260 μm, a width of 53 mm and a length of 445 mm. An aluminum lead plate was welded to a tip of the positive electrode sheet which was then subjected to 30 minutes of dehydration drying at 230° C. in dry air having a dew point of −40° C. or less.

After laminating the thus heat-treated positive electrode sheet (1), a separator (3) made of a micro-porous polyethylene/polypropylene film, the negative electrode sheet (2) and the separator (3) in that order, they were coiled in a spiral form.

The thus coiled body was put into a bottomed cylinder type battery case (4), which also serves as a negative electrode terminal, made of iron which has been plated with nickel. As an electrolyte, 1 mol/liter of $LiPF_6$ (in a 2:8 weight ratio mixture solution of ethylene carbonate and diethyl carbonate) was injected into the battery case which was cooled at 0° C. A battery cover (5) having a positive electrode terminal was cramped via a gasket (6) to produce a cylinder type battery of 65 mm in height and 18 mm in outer diameter (FIG. 1), namely Battery No. 1. In this case, the positive electrode terminal (5) was connected with the positive electrode sheet (1), and the battery case (4) with the negative electrode sheet, in advance using lead terminals. In the drawing, (7) is an explosion-proof valve.

Thereafter, the thus prepared battery was charged to 3.2 V at 0.2 mA/cm² and then allowed to stand for 2 weeks at 50° C.

After completion of the storage, this was charged to 4.1 V at 1 mA/cm² and then discharged to 2.8 V at 1 mA/cm². This was again charged to 4.1 V at 1 mA/cm² and then discharged to 2.8 V at 0.5 mA/cm² to calculate its discharging capacity. Thereafter, a cycle test of 4.1–2.8 V was carried out at 5 mA/cm to measure capacity keeping ratio after 300 cycles. The results are shown in Table 12.

EXAMPLE 14

Battery No. 2 was prepared by repeating the procedure of Example 13, except that 24 pieces of lithium foil having a size of 10 mm×55 mm were used and transfer of the foil was carried out by a polyethylene board transfer (one side and then the other, transfer of 10 lithium foil pieces at one time), and its evaluation was carried out in the same manner as described in Example 13.

The results are shown in Table 13.

EXAMPLE 15

Battery Nos. 3 to 15 were prepared in the same manner by changing size, shape, numbers and the like of lithium foil as shown in Table 12. Discharging capacity and cycle characteristics of these batteries were evaluated in the same manner as described in Example 13.

The results are shown in Table 13.

Comparative Example 1

The same evaluation as in Example 13 was carried out by preparing Battery Nos. a to e in which lithium foil was not applied or covering ratio of the negative electrode sheet with lithium foil was smaller than 10% or thickness of lithium foil was smaller than 5 μm or larger than 150 μm.

The results are shown in Table 12.

TABLE 12

| No. | Pattern *1 | Size of Li foil (mm) | Cover ratio | Li foil transfer | Capacity (mAH) *2 | Capacity ratio *3 |
|---|---|---|---|---|---|---|
| 1 | stripe | 20 × 55 × 0.04 | 40% | roller | 1605 | 81% |
| 2 | " | 10 × 55 × 0.04 | " | board | 1650 | 83% |
| 3 | " | 80 × 55 × 0.04 | " | roller | 1540 | 70% |
| 4 | " | 4 × 55 × 0.04 | " | " | 1665 | 85% |
| 5 | overall | 520 × 55 × 0.02 | 100% | " | 1710 | 81% |
| 6 | " | 520 × 55 × 0.03 | " | " | 1720 | 72% |
| 7 | stripe | 8 × 55 × 0.03 | 60% | " | 1550 | 80% |
| 8 | " | 8 × 55 × 0.03 | " | board | 1510 | 83% |
| 9 | " | 10 × 55 × 0.075 | 20% | roller | 1620 | 74% |
| 10 | frame | 10 × 20 × 0.05 | 30% | " | 1505 | 80% |
| 11 | " | 5 × 10 × 0.1 | 15% | " | 1575 | 71% |
| 12 | stripe | 2 × 55 × 0.05 | 35% | " | 1640 | 83% |
| 13 | " | 4 × 55 × 0.08 | 20% | board | 1600 | 77% |
| 14 | disc | 10 mm × 0.08 mm | " | roller | 1525 | 74% |
| 15 | " | 20 mm × 0.05 mm | 30% | " | 1580 | 82% |
| a | none | — | — | — | 1120 | 84% |
| b | stripe | 20 × 55 × 0.18 | 10% | roller | 1480 | 52% |
| c | " | 20 × 55 × 0.2 | 4% | " | 1310 | 45% |
| d | " | 4 × 55 × 0.18 | 30% | " | 1425 | 43% |
| e | frame | 10 × 20 × 0.05 | 4% | board | 1250 | 68% |

*1, laminating pattern of lithium foil;
*2, discharging capacity;
*3, keeping ratio of capacity after 300 cycles As is apparent from the results shown in Table 12, batteries in which lithium foil having a thickness of from 5 to 150 μm is laminated on the negative electrode sheet in at least one pattern selected from overall, stripe, frame and disc shapes at a covering ratio of 10 to 100% have large discharging capacity and excellent cycle characteristics as compared with other batteries in which lithium foil is not laminated or its thickness or covering ratio is outside the above ranges.

EXAMPLE 16

A cylinder type battery was prepared in the same manner as described in Example 13.

After completion of cramping, the thus prepared battery was subjected to aging at 0° C. for 2 hours and then at 25° C. for 15 hours, charged to a constant voltage of 3.1 V at 0.4 mA/cm² and at 25° C. and then stored for 2 weeks at 50° C. Voltage of this battery after 3 days of the aging was 2.58 V.

After completion of the storage, this was charged to 4.1 V at 1 mA/cm² and then discharged to 2.8 V at 1 mA/cm². This was again charged to 4.1 V at 1 mA/cm² and then discharged to 2.8 V at 0.5 mA/cm² to calculate its discharging capacity. Thereafter, a cycle test of 4.1–2.8 V was carried out at 2.5 mA/cm² to measure capacity keeping ratio after 300 cycles. The results are shown in Table 13.

The term "pre-charge" shown in Table 13 means the just described charging procedure.

EXAMPLE 17

After completion of steps until cramping in the same manner as described in Example 16, the thus prepared battery was subjected to aging at 0° C. for 2 hours and then at 25° C. for 15 hours, and a cycle of 3.1–2.7 V was repeated 50 times at 0.75 mA/cm² and at 25° C. (this was carried out by a combination of constant voltage charging and constant voltage constant current discharging). Voltage of this battery after 3 days of the aging was 2.85 V.

Thereafter, evaluation of this battery was carried out in the same manner as described in Example 16. The results are shown in Table 14.

The term "pre-charge/discharge" shown in Table 14 means the just described charge/discharge cycle procedure.

EXAMPLE 18

A battery was prepared and its pre-charge was carried out in the same manner as in the Example 16 except that $SnB_{0.2}P_{0.5}K_{0.1}Ge_{0.1}O_{2.7}S_{0.02}$ (6.8 μm in average particle size) was used as a negative electrode material. Thereafter, the evaluation was carried out in the same manner as in Example 1. The results are shown in Table 15.

TABLE 13

| | Pre-charge conditions | | | | | Discharge | Capacity |
|---|---|---|---|---|---|---|---|
| No. | 25° C. *1 | heat *2 | V *3 | cur *4 | time (h) | Volt *5 | capacity (mAh) *6 | ratio (%) *7 |
| 1 | 15 | — | 3.1 | 0.4 | 2 | 2.58 | 1600 | 81 |
| 2 | 75 | — | 3.1 | 0.4 | 2 | 2.53 | 1585 | 82 |
| 3 | 15 | 50° C. /48 h | 3.1 | 0.4 | 2 | 2.61 | 1610 | 84 |
| 4 | 15 | — | 3.4 | 0.4 | 2 | 3.01 | 1560 | 79 |
| 5 | 15 | — | 2.2 | 0.4 | 2 | 1.70 | 1490 | 75 |
| 6 | 15 | — | 3.7 | 0.4 | 4 | 3.41 | 1425 | 75 |
| 7 | 15 | — | 3.1 | 0.1 | 2 | 2.55 | 1625 | 83 |
| 8 | 15 | — | 3.1 | 1.2 | 2 | 2.60 | 1590 | 78 |
| 9 | 15 | — | 3.1 | 2.7 | 2 | 2.85 | 1610 | 75 |
| 10 | 240 | — | 3.1 | 0.4 | 2 | 2.41 | 1570 | 80 |
| 11 | 480 | — | 3.1 | 0.4 | 2 | 2.28 | 1555 | 79 |
| 12 | 1 | — | 3.1 | 0.4 | 2 | 2.55 | 1595 | 75 |
| a | — | — | — | — | — | 0.85 | 1375 | 70 |
| b | 0.5 | — | 1.7 | 0.4 | 2 | 1.35 | 1400 | 71 |
| c | 15 | — | 1.1 | 0.2 | 2 | 0.91 | 1390 | 70 |
| d | 15 | — | 4.1 | 2.7 | 1 | 3.85 | 1480 | 65 |

*1, aging time at 25° C. until pre-charging;
*2, condition of heat aging until pre-charging;
*3, voltage setting (V);
*4, current value (mA/cm²);
*5, voltage (V) of battery 3 days after pre-charging;
*6, discharging capacity (mAh);
*7, capacity keeping ratio (%) after 300 cycles

TABLE 14

| No. | 25° C. *1 | heat *2 | V-1 *3 | V-2 *4 | cur *5 | cycle *6 | Volt *7 | Discharge capacity *8 | Capacity ratio *9 |
|---|---|---|---|---|---|---|---|---|---|
| 1 | 15 | — | 3.1 | 2.7 | 0.75 | 50 | 2.85 | 1610 | 83 |
| 2 | 15 | 50° C. /72 h | 3.1 | 2.7 | 0.75 | 50 | 2.88 | 1595 | 83 |
| 3 | 15 | — | 3.3 | 2.5 | 0.75 | 50 | 2.95 | 1600 | 81 |
| 4 | 15 | — | 2.5 | 1.8 | 0.75 | 50 | 2.30 | 1580 | 80 |
| 5 | 15 | — | 1.8 | 1.2 | 0.75 | 100 | 1.51 | 1550 | 75 |
| 6 | 15 | — | 3.5 | 3.0 | 0.75 | 50 | 3.28 | 1520 | 80 |
| 7 | 15 | — | 3.1 | 2.7 | 0.25 | 50 | 2.77 | 1600 | 80 |
| 8 | 15 | — | 3.1 | 2.7 | 2.7 | 50 | 2.70 | 1570 | 81 |
| 9 | 15 | — | 3.1 | 2.7 | 0.75 | 100 | 2.88 | 1610 | 82 |
| 10 | 15 | — | 3.1 | 2.8 | 0.5 | 10 | 2.80 | 1575 | 79 |
| 11 | 240 | — | 3.2 | 2.5 | 0.75 | 100 | 2.91 | 1600 | 78 |
| 12 | 2 | 50° C. /2 h | 3.1 | 2.7 | 0.75 | 50 | 2.78 | 1570 | 80 |
| a | 15 | — | 1.6 | 1.0 | 0.75 | 50 | 1.35 | 1490 | 72 |
| b | 15 | — | 1.2 | 0.5 | 0.75 | 50 | 0.82 | 1380 | 78 |
| c | 15 | — | 4.1 | 2.5 | 5.0 | 50 | 3.90 | 1495 | 68 |
| d | 15 | — | 4.1 | 3.8 | 0.75 | 750 | 3.92 | 1310 | 67 |

*1, aging time at 25° C. until pre-charge/discharge;
*2, condition of heat aging until pre-charge/discharge;
*3, charging voltage (V);
*4, discharging voltage (V);
*5, current value (mA/cm$^2$);
*6, the number of cycles (times);
*7, voltage (V) of battery 3 days after pre-charge/discharge;
*8, discharging capacity (mAh);
*9, capacity keeping ratio (%) after 300 cycles

TABLE 15

| No. | Aging *1 | Setting Voltage (V) | Current (mA/cm$^2$) | Time (h) | Volt. (V)*2 | Discharge capacity (mAh) | Capacity ratio (%) *3 |
|---|---|---|---|---|---|---|---|
| 1 | 15 | 3.1 | 0.3 | 2 | 2.52 | 1620 | 83 |
| 2 | 15 | 2.5 | 0.3 | 2 | 2.12 | 1600 | 79 |
| 3 | 3 | 3.4 | 1.1 | 1 | 3.19 | 1585 | 79 |
| 4 | 240 | 3.1 | 0.2 | 5 | 2.68 | 1605 | 82 |
| 5 | 15 | 2.0 | 0.4 | 2 | 1.67 | 1590 | 79 |
| 6 | 10 | 3.8 | 0.5 | 3 | 3.52 | 1570 | 78 |
| a | — | — | — | — | 0.72 | 1350 | 72 |
| b | 15 | 1.5 | 0.4 | 2 | 1.10 | 1430 | 73 |

*1, aging time at 25° C. until pre-charge;
*2, voltage of battery 3 days after pre-charge;
*3, capacity keeping ratio after 300 cycles As is apparent from the results shown in Tables 13 to 15, batteries in which their voltage is adjusted to 1.5 to 3.8 by carrying out at least one cycle of charging or charging and discharging during their aging have large discharge capacity and excellent cycle characteristics as compared with other batteries having a voltage of smaller than 0.5 V or larger than 3.8 V.

INDUSTRIAL APPLICABILITY

A nonaqueous secondary battery having high capacity, high energy density and high cycle characteristics can be obtained by the use of a composite oxide or composite chalcogen negative electrode material capable of intercalating and deintercalating lithium in which, like the case of the present invention, a metal foil mainly comprising lithium is pressed on the negative electrode sheet to effect pre-intercalation of lithium into the negative electrode material.

We claim:

1. A nonaqueous secondary battery which comprises:
   a positive electrode sheet having a layer mainly comprising a lithium-containing metal oxide;
   a negative electrode sheet having (1) a layer mainly comprising at least one compound selected from the group consisting of a metal oxide, a metalloid oxide, a metal chalcogenide and a metalloid chalcogenide which are capable of intercalating and deintercalating lithium, (2) at least one auxiliary layer containing water-insoluble electrically conductive particles provided on said layer (1), and (3) a metal material film mainly comprising lithium laminated on said auxiliary layer (2);
   an electrolytic solution containing a lithium salt; and
   a separator,
   wherein said auxiliary layer is laminated with said metal material film mainly comprising lithium either:
   (i) wholly, or
   (ii) partially in at least one pattern selected from the group consisting of stripe, frame, and disc shapes.

2. The nonaqueous secondary battery as in claim 1, wherein the metal material mainly comprising lithium has a covering ratio on said auxiliary layer of 10 to 100%.

3. The nonaqueous secondary battery as in claim 1, wherein the metal material mainly comprising lithium has a covering ratio on said auxiliary layer of 20 to 100%.

4. The nonaqueous secondary battery as in claim 1, wherein said metal material mainly comprising lithium has a thickness of 5 to 150 μm.

5. The nonaqueous secondary battery as in claim 1, wherein the water insoluble particles present in said auxiliary layer are a mixture of electrically conductive particles and other particles having substantially no electrical conductivity.

6. The nonaqueous secondary battery as in claim 1, wherein said auxiliary layer has a thickness of 0.2 to 40 μm.

7. The nonaqueous secondary battery as in claim 1, wherein said auxiliary layer has a thickness of 0.3 to 20 μm.

8. The nonaqueous secondary battery as in claim 1, wherein said layer mainly comprising a metal or metalloid oxide and/or a chalcogenide comprises a tin-containing composite oxide and/or composite chalcogen compound.

9. The nonaqueous secondary battery as in claim 8, wherein said tin-containing composite oxide is represented by formula (1)

$$SnM^1_aO_t \qquad (1)$$

wherein $M^1$ represents two or more elements selected from the group consisting of Al, B, P, Si, Ge, elements of Groups 1, 2 and 3 of the periodic table and halogen, a represents a number of 0.2 to 3, and t represents a number of 1 to 7.

10. The nonaqueous secondary battery as in claim 8, wherein said tin-containing composite oxide is represented by formula (4)

$$SnM^3_cM^4_dO_t \qquad (4)$$

wherein $M^3$ represents at least one element selected from the group consisting of Al, B, P, Si and Ge, $M^4$ represents at least one element selected from the group consisting of elements of Groups 1, 2 and 3 of the periodic table and halogen, c is a number of 0.2 to 2, d represents a number of 0.01 to 1, wherein $0.2<c+d<3$, and t represents a number of 1 to 7.

11. The nonaqueous secondary battery as in claim 1, wherein said nonaqueous secondary battery is a cylindrical battery.

12. A method for producing a nonaqueous secondary battery which comprises:

a positive electrode sheet having a layer mainly comprising a lithium-containing metal oxide;

a negative electrode sheet having (1) a layer mainly comprising at least one compound selected from the group consisting of a metal oxide, a metalloid oxide, a metal chalcogenide and a metalloid chalcogenide which are capable of intercalating and deintercalating lithium, (2) at least one auxiliary layer containing water-insoluble electrically conductive particles provided on said layer (1), and (3) a metal material film mainly comprising lithium laminated on said auxiliary layer (2);

an electrlytic solution containing a lithium salt; and a separator;

said method comprising:

laminating (1) a layer mainly comprising at least one compound selected from the group consisting of a metal oxide, a metalloid oxide, a metal chalcogenide and a metalloid chalcogenide which are capable of intercalating and deintercalating lithium, (2) at least one auxiliary layer containing water-insoluble electrically conductive particles, and (3) a metal material film mainly comprising lithium in said order; and aging after injection of the electrolytic solution so that lithium is pre-intercalated into the negative electrode sheet, wherein said auxiliary layer is laminated with said metal material film mainly comprising lithium either:

(i) wholly, or (ii) partially in at least one pattern selected from the group consisting of stripe, frame, and disc shapes.

13. The method for producing a nonaqueous secondary battery as in claim 12, wherein said process comprises electrochemically pre-intercalating, into said negative electrode sheet, lithium in an amount of 1 to 30 g/m².

14. The method for producing a nonaqueous secondary battery as in claim 12, wherein, in said aging, the aging temperature is from 0 to 80° C. and the aging period is from 1 hour to 60 days.

15. The method for producing a nonaqueous secondary battery as in claim 12, wherein in said aging, the aging temperature is from 20 to 70° C. and the aging period is from 3 to 30 days.

16. The method for producing a nonaqueous secondary battery as in claim 12, wherein in said laminating of the metal material mainly comprising lithium on said auxiliary layer is by a roll transfer method or a board transfer method.

17. The method for producing nonaqueous secondary battery as in claim 12, wherein said nonaqueous secondary battery is a cylindrical battery.

* * * * *